United States Patent
Sachs et al.

(10) Patent No.: US 7,077,334 B2
(45) Date of Patent: Jul. 18, 2006

(54) POSITIVE PRESSURE DROP-ON-DEMAND PRINTING

(75) Inventors: Emanuel M. Sachs, Newton, MA (US); Blake W. Gleason, Berkeley, CA (US); James G. Serdy, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 386 days.

(21) Appl. No.: 10/411,356

(22) Filed: Apr. 10, 2003

(65) Prior Publication Data
US 2004/0217186 A1 Nov. 4, 2004

(51) Int. Cl.
B05B 17/04 (2006.01)
A62C 31/02 (2006.01)

(52) U.S. Cl. .............................. 239/11; 239/7; 239/390; 239/397

(58) Field of Classification Search .................. 259/11, 259/7, 337, 390, 397; 347/6, 21, 10, 11, 347/15
See application file for complete search history.

(56) References Cited

U.S. PATENT DOCUMENTS

| | | | |
|---|---|---|---|
| 3,667,678 A | 6/1972 | Haskell | |
| 3,840,758 A | 10/1974 | Zoltan | |
| 3,848,118 A | 11/1974 | Rittberg | |
| 3,857,049 A | 12/1974 | Zoltan | |
| 3,958,249 A | 5/1976 | DeMaine et al. | |
| 3,963,151 A | 6/1976 | North | |
| 3,979,756 A | 9/1976 | Helinski et al. | |
| 4,147,955 A | 4/1979 | King | |
| 4,245,225 A | 1/1981 | Fillmore et al. | |
| 4,272,773 A | 6/1981 | Halasz | |
| 4,274,055 A | 6/1981 | Assard | |
| 4,282,533 A | 8/1981 | Brooks | |
| 4,306,245 A | 12/1981 | Kasugayama et al. | |

(Continued)

OTHER PUBLICATIONS

MicroFab Technologies, Inc., PH-03 Print Head, Assembly No. 10444, Operating Guide, date unknown.

*Primary Examiner*—Davis Hwu
(74) *Attorney, Agent, or Firm*—Steven J. Weissburg

(57) ABSTRACT

A drop on demand printer has a nozzle with an orifice and a surrounding annular land. Surrounding the land is an edge, which is surrounded by a perimetrical surface that is inclined to the land at an angle α. A pressure controller maintains a positive overpressure on liquid to be printed such that a cap of liquid is substantially always present covering the orifice and the land. The edge between the land and the perimetrical surface prevents liquid from overflowing, and maintains the cap, if the pressure is maintained between lower and upper limits disclosed. The liquid to be printed preferably wets the orifice land, which may be alumina, glass, ceramic, and others. Liquids with very small, even zero, wetting angles relative to the land may be used, such as water and organic solvents, including, isopropyl and ethyl alcohol and chloroform. The liquid can be loaded with dissolved polymers, or particles, such as of polymer or ceramic. Very small drops can be printed, by using an orifice of about 40 microns effective diameter, with a land of about 90 microns effective diameter. The printer can be used for any drop dispensing application, such as ink jet, Three Dimensional printing, and also for depositing small amounts of pharmaceutical materials into a receptacle, or drug delivery vehicle. A means for establishing a temperature differential, with a higher upstream and lower downstream temperature, eliminates any gas bubbles at the orifice.

34 Claims, 18 Drawing Sheets

U.S. PATENT DOCUMENTS

| | | |
|---|---|---|
| 4,308,546 A | 12/1981 | Halasz |
| 4,366,490 A | 12/1982 | Debonte et al. |
| 4,370,662 A | 1/1983 | Hou et al. |
| 4,388,627 A | 6/1983 | Umezawa |
| 4,395,719 A | 7/1983 | Majweski et al. |
| 4,418,354 A | 11/1983 | Perduijn |
| 4,446,469 A | 5/1984 | Perna |
| 4,499,479 A | 2/1985 | Chee-Shuen Lee et al. |
| 4,523,202 A | 6/1985 | Gamblin |
| 4,599,626 A | 7/1986 | Rich |
| 4,625,373 A | 12/1986 | Duffield et al. |
| 4,630,072 A | 12/1986 | Scardovi et al. |
| 4,641,155 A | 2/1987 | Zoltan |
| 4,698,644 A | 10/1987 | Drago et al. |
| 4,714,932 A | 12/1987 | Reynaud |
| 4,727,379 A | 2/1988 | Sourlis et al. |
| 4,746,929 A | 5/1988 | Lin et al. |
| 4,901,092 A | 2/1990 | Moriyama |
| 5,039,598 A | 8/1991 | Abramsohn et al. |
| 5,063,393 A | 11/1991 | Clark et al. |
| 5,196,860 A | 3/1993 | Pickell et al. |
| 5,204,055 A | 4/1993 | Sachs et al. |
| 5,285,144 A | 2/1994 | Hsu |
| 5,330,807 A | 7/1994 | Williams |
| 5,340,656 A | 8/1994 | Sachs et al. |
| 5,387,380 A | 2/1995 | Cima et al. |
| 5,490,882 A | 2/1996 | Sachs et al. |
| 5,645,377 A | 7/1997 | Kauschinger et al. |
| 5,660,621 A | 8/1997 | Bredt |
| 5,766,441 A | 6/1998 | Arndt |
| 5,775,402 A | 7/1998 | Sachs et al. |
| 5,781,212 A * | 7/1998 | Burr et al. .................. 347/84 |
| 5,807,437 A | 9/1998 | Sachs et al. |
| 5,838,350 A | 11/1998 | Newcombe |
| 5,940,674 A | 8/1999 | Sachs et al. |
| 6,003,971 A * | 12/1999 | Hanks et al. ................. 347/43 |
| 6,036,777 A | 3/2000 | Sachs |
| 6,070,973 A | 6/2000 | Sachs et al. |
| 6,102,513 A * | 8/2000 | Wen .............................. 347/15 |
| 6,352,328 B1 * | 3/2002 | Wen et al. .................... 347/15 |
| 6,397,922 B1 | 6/2002 | Sachs et al. |
| 6,454,384 B1 * | 9/2002 | Peeters et al. ................ 347/21 |
| 6,508,980 B1 | 1/2003 | Sachs et al. |
| 6,596,224 B1 | 7/2003 | Sachs et al. |
| 2003/0156963 A1 | 8/2003 | Lorenz et al. |
| 2004/0009086 A1 | 1/2004 | Sachs et al. |

* cited by examiner

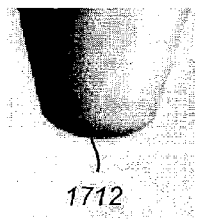 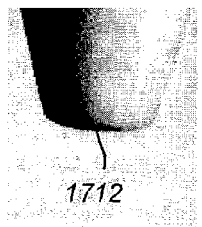 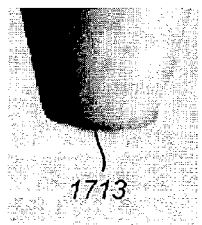 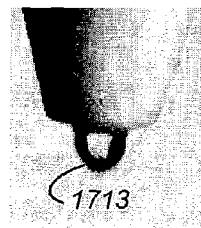 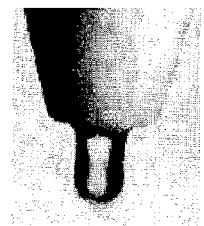
*Fig. 17A*  *Fig. 17B*  *Fig. 17C*  *Fig. 17D*  *Fig. 17E*
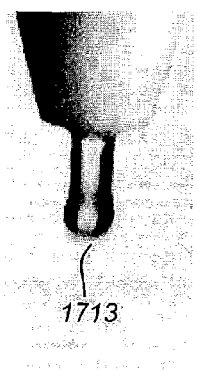 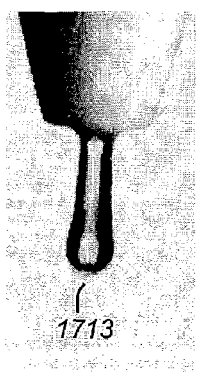 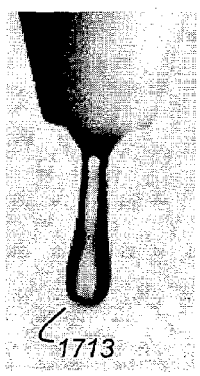 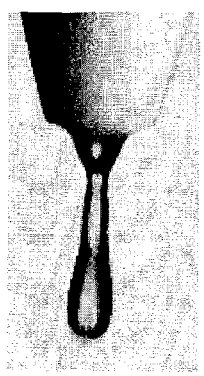 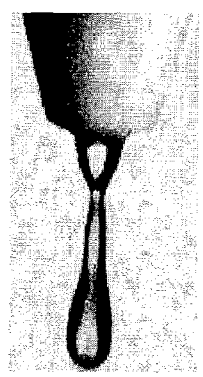
*Fig. 17F*  *Fig. 17G*  *Fig. 17H*  *Fig. 17I*  *Fig. 17J*
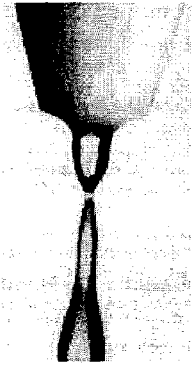 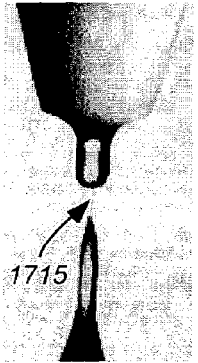 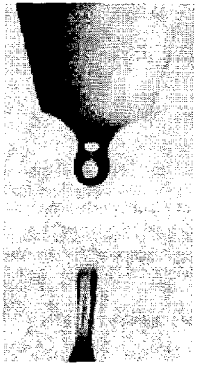 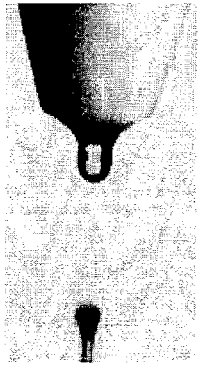 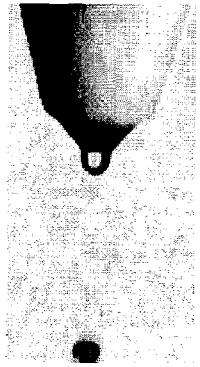
*Fig. 17K*  *Fig. 17L*  *Fig. 17M*  *Fig. 17N*  *Fig. 17O*
 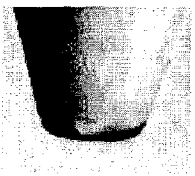 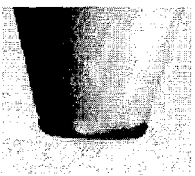 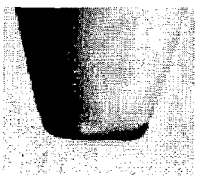 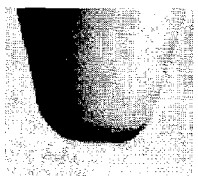
*Fig. 17P*  *Fig. 17Q*  *Fig. 17R*  *Fig. 17S*  *Fig. 17T*

POSITIVE PRESSURE DROP-ON-DEMAND PRINTING

A partial summary is provided below, preceding the claims.

The inventions disclosed herein will be understood with regard to the following description, appended claims and accompanying drawings, where:

BRIEF DESCRIPTION OF THE DRAWINGS

FIGS. 17A–17T is a series of digital images showing a positive pressure nozzle with a fluid cap starting in a static condition, covering the orifice and land, then ejecting a drop, and returning to a static condition with a fluid cap covering the orifice and land at 17T, each successive image being taken at a four microsecond interval, showing a total elapsed time of approximately 0.2 milliseconds;

DETAILED DESCRIPTION

Figure 1A:
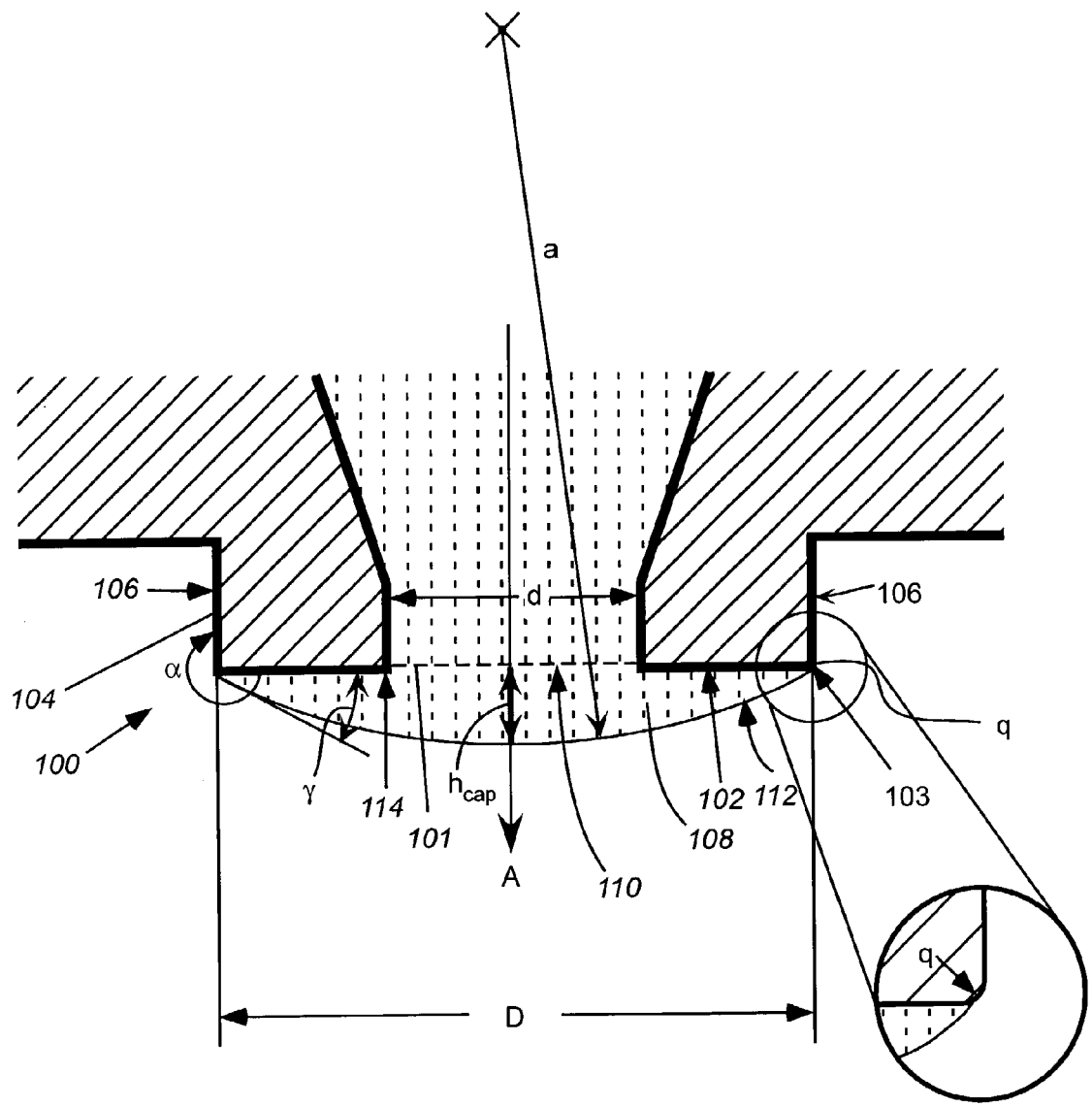
FIG. 1A is a schematic cross-sectional view of a positive pressure nozzle having a 270° outer edge angle, with a fluid cap in place.

Drop-on-demand printing is a type of printing in which a drop of liquid to be printed is dispensed from a printhead nozzle at a specific time when, and a specific place where, such a drop of liquid is desired. Typically the printhead moves relative to a region of a target in which drops are to be printed. (The printhead or the target can move, or, both can move.) When the printhead is in an appropriate location, taking into account the time it takes for a drop to travel from the nozzle to the target, the velocity at which the nozzle is moving, and other factors, a single drop is ejected from an orifice in the printhead nozzle. Depending on the pattern to be printed, soon thereafter, another drop may be ejected, and another, and a whole group of drops. Such a group might be ejected at a relatively uniform frequency, or at non-uniform times, depending on the pattern to be printed, speed of printhead motion, etc. Thus, when such a printer is nominally printing, there are time periods during which a drop is being ejected, and time periods during which no drop is being ejected.

A typical printhead may take for instance, 80 microseconds for a drop to begin to emerge from a nozzle orifice, and then to detach from the bulk of liquid that remains within the orifice. In such a typical set up, as the printhead is moving along the target, drops may be ejected at a frequency of 1 kHz, thus having a period of a full millisecond between drop ejections. Therefore, for 0.92 milliseconds at a time (920 microseconds) out of a millisecond, there is no drop that is in the process of being ejected. This is only a typical situation used for discussion purposes. The frequency of droplet ejection can be much higher, and the duration of a single drops ejection can be longer or shorter. Generally, as used herein, a printhead is said to be printing during times when it is ejecting droplets at a relatively regular frequency, such as 1 kHz. It is said to be ejecting a droplet during the 80 microseconds that it takes for a single droplet to be ejected. At other times during printing within the relatively regular periods between drop ejection, when a droplet is not being ejected, the printhead is said to be holding for the next droplet ejection.

Such printing machines are not printing constantly. Typically, the printhead has a home position that is not adjacent the target, from which the printhead moves to locations adjacent the target where printing is to take place, and to which it returns. The printhead may reside at home, for many minutes at a time during a printing job, or even longer. In this disclosure the printhead is said to be parked, when it is at such a rest position. The printhead also must move from the rest position to a location where it begins to print liquid, but does not print during this motion. Sometimes, it also prints at one general location of the target for some time, such as a minute, and then moves to another general location of the target, where it will print for another period of time, but does not print during the motion from the first general location to the second general location. In this disclosure, the printhead is said to be traveling during these periods where it is moving relative to the target, but not printing.

Collectively, the time that the printhead is parked and the time that the printhead is traveling, the nozzle is said to be quiescent. Thus, the various times that a printhead is not ejecting a droplet include: the times that is is quiescent (parked, and traveling); and when it is holding, between droplet ejections during a nominal time of printing. All of these times that a printhead is not ejecting a droplet are collectively referred to herein as times that the printhead is static.

In drop-on-demand printing, wetting of the printed liquid onto the surface surrounding the orifice referred to herein as the orifice face, or the orifice land, is traditionally considered to be undesirable. Wetting of the orifice face with such liquids causes printhead failure, either because the wetting, and therefore drop formation, was unpredictable, or because dissolved or suspended solids were deposited around the orifice as the wetted binder fluid evaporated thus, leading to irregular drop formation. Wetting the orifice land, typically has been prevented by a combination of non-wetting coatings on the orifice land, use of high surface tension, relatively non-wetting printing fluids, and negative pressure applied to the fluid to draw it back into the orifice during static times.

Such drop-on-demand printing includes ink-jet printing, for many diverse users, that print visible inks. Printing also includes printing binder solutions for solid freeform fabrication methods, such as are known as "Three-Dimensional Printing" (3D Printing), as described in U.S. Pat. No. 5,204,055, entitled THREE-DIMENSIONAL PRINTING TECHNIQUES, issued Apr. 20, 1993, to inventors Emanuel M. Sachs et al., on a patent application filed Dec. 8, 1989, and other patents that include as an inventor Emanuel M. Sachs, hereof, listed in a section below entitled 3D Printing related patents.

Jet dispensing similar to ink-jet printing, but not used for printing perse may also be used to dispense liquids such as pharmaceuticals, chemicals, biological reagents, etc.

Preventing wetting has drawbacks and difficulties. Some very low surface tension printing liquids, such as a wide variety of organic solvents, e.g., chloroform and alcohol, are very useful in some applications, and must be used. (As used herein, and in the claims, surface tension of a liquid refers to the surface tension of the liquid relative to the surrounding atmosphere.) These liquids wet a wide variety of materials, and it is thus very difficult to provide a surface material or coating that such liquids will not wet. Thus, when a droplet is ejected from a traditional nozzle orifice, it also wets the land. After ejection, a residue may build upon the land and within the orifice mouth. Even if such a non-wetting coating could be established, they are very delicate, and prone to lose their non-wetting characteristics if scratched, fouled, or damaged. It is also desired to print liquids that may not have such a low surface tension, but which are loaded with a material, such as various polymers or ceramic particles, which eventually build up on areas of the surface that the liquid has touched and from which it has afterwards receded. As a point of reference, water has a surface tension of approximately 72 dynes/cm. The surface tension of isopropyl alcohol is approximately 21.7 dynes/cm, of ethyl alcohol is approximately 24 dynes/cm, and of chloroform is 27 dynes/cm.

Typically, with traditional, non-wetting systems, and aqueous based liquids, static periods of even a day might not present a problem of the liquid crusting around the orifice and non-uniform subsequent behavior. However, many useful liquids, such as organic solvents, are highly volatile. Thus, static periods of as short as ten seconds can result in crusting and deposition of material that causes subsequent non-uniform behavior. The same is also true of liquids that do not have so low a surface tension, but which are loaded with polymers, either in solution or in particle form, or ceramic particles.

A known technique to print drop-on-demand is to apply a pressure to the liquid in the orifice that is negative, relative to the atmosphere. This is used in connection with a non-wetting surface. The negative pressure helps maintain the liquid meniscus within the orifice, and not wetting the orifice land. However, for very low surface tension printing liquids, this negative pressure method does not work reliably, and the fluids wet the land as they are ejected, regardless of the negative pressure. Once having wet the land, fluid residue remains and is not sucked back entirely into the orifice.

Thus, there is need for an apparatus to dispense liquid, and also a method of using such an apparatus, which can be used with liquids that have a relatively to very low surface tension, and with liquids that have a significant solids loading, even with a relatively higher surface tension.

A new positive pressure method of drop-on-demand printing is disclosed herein which eliminates the requirement for a non-wetting system. Providing a binder fluid or an orifice material with properties to ensure non-wetting are not necessary for reliable drop formation. In fact, slight positive pressure (relative to atmosphere) is maintained in the printed liquid at the nozzle orifice to intentionally achieve wetting of a land area around the orifice. The positive pressure causes a printing liquid meniscus to bulge out from the orifice until it detaches from the orifice edge and wets the land surrounding the orifice. The liquid wetting continues outward from the orifice edge along the surface of the orifice land, and would continue uncontrolled were it not for an additional feature: the orifice land ends relatively abruptly with a relatively sharp corner to which the meniscus attaches, thus defining the wetting boundary for the printing liquid. With such a boundary in place, the liquid meniscus forms a spherical section cap on the orifice and land. The thickness (depth) of the cap can be varied by adjusting the level of positive pressure.

Benefits of this controlled wetting include the possibility of drop-on-demand printing with low surface tension liquids, and also the possibility to form drops with a loaded liquid, such as polymer or ceramic particles or polymer solutions, without building up solid deposits at the orifice.

The following discussion uses an example of a 3D Printing system, in which the liquid that is printed is a binder. However, that is merely an example and should not be considered to be limiting in any case. The principles, methods and apparatus disclosed herein can be used in connection with any system in which liquid is dispensed through a nozzle orifice, including but not limited to conventional ink jet printing, three dimensional printing, pharmaceutical dispensing, and evaporative bubble printing, also known as thermal ink-jet printing.

Discussion

FIG. 1A is a schematic cross-section view. A nozzle 100 has a annular body 104 that defines an orifice 110, which is concentric around an axis A. Concentric around the orifice is an orifice land 102, also referred to herein as a face. The land is surrounded by a circumferential surface 106. An outer edge 103 is between the land 102 and the circumferential surface 106. The edge 103 prevents wetting further outward as explained below. This controlled, limited wetting achieves a uniform, predictable fluid cap 108, through which drops can be ejected.

An important feature of a positive pressure Drop-on-Demand printhead is that it controls the wetting condition of the binder fluid at the orifice 110 where drops are ejected. In particular, the binder fluid is intentionally caused to wet the land 102 of the orifice, but only to a well-defined boundary 103. Controlled wetting is applied at certain times the nozzle is static, particularly the quiescent times a printhead is parked and travelling. If the duration of the non-ejecting holding period during printing is sufficiently long, wetting may also be applied during such holding times. If the hold time is so brief that no crusting, etc. problems arise, then it is not necessary to cover the land during such times. But, there is no harm in maintaining the liquid cap during such hold times.

Intentional wetting is obtained by imposing a slight positive pressure (relative to atmosphere) on the binder fluid inside the orifice.

Figure 10:
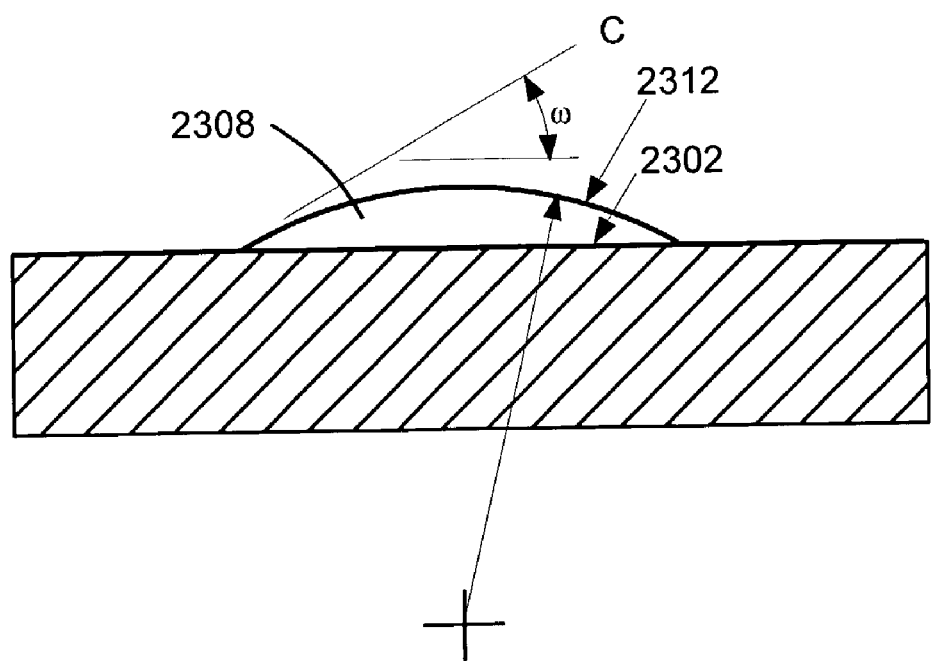
FIG. 10 shows schematically in cross-section view a sessile drop on a surface, identifying wetting angle ω.

The wetting angle ω of a system of a fluid and a surface 2302 in an atmosphere, is shown in FIG. 10. It is the angle that a tangent C to the fluid meniscus 2312 of a sessile drop 2308 of the fluid, makes at the contact point of the meniscus 2312 and the surface, relative to the surface upon which the fluid rests. This is a standard definition of a wetting angle using a sessile drop. The wetting angle is defined at ambient pressure. As used herein, the wetting angle is measured from the surface, within the liquid, toward the meniscus. The wetting angle of water on glass is approximately 30°. Using this convention, systems that are relatively wetting have relatively smaller wetting angles, and systems that are relatively less wetting have larger wetting angles. Systems that have a wetting angle of greater than 90° are considered to be non-wetting. A system with a wetting angle of exactly 90° would theoretically form droplets on a surface of exact hemispheres. Less wetting systems form droplets on a surface as a partial sphere that is more than half a sphere. More wetting systems form flatter droplets. (Some sources use a different convention and measure the wetting angle from the tangent external of the liquid, toward the portion of the surface not contacting the liquid. With that other convention, more wetting systems have relatively larger wetting angles.)

The techniques and apparatus of the inventions disclosed herein have applicability with non-wetting systems, but, a primary focus of this disclosure is with wetting systems. In particular, this system allows ejecting systems having a wetting angle down to the limiting case of zero degrees In the systems discussed herein, the pressure inside the liquid is positive relative to (greater than) ambient by an amount referred to herein in some places as an overpressure. Thus, a liquid droplet on a surface as described herein behaves differently than does a droplet with internal pressure at ambient. Furthermore, the surface with which the liquid interfaces in the systems disclosed herein, is not an infinite extended flat plane as shown at 2302 in FIG. 10. Rather, as shown in FIG. 1A, it has a well defined edge 103, dividing the surface into two regions: an inner land 102, with which the liquid interfaces, and a circumferential surface 106 that the liquid typically does not interface (wet). (If the liquid does interface with a significant extent of the circumferential surface, the system is not performing in accordance with the inventions disclosed herein.) Further, the central portion is open, and not a surface. It is liquid filled.

As used herein, the edge angle is designated α, and is measured from the surface that includes the orifice, to the circumferential surface. An edge angle α of 180° would present a flat plane from the land 102 to the circumferential surface 106, thus not having an edge. Thus, all useful edge angles are greater than 180°.

Figure 11A:
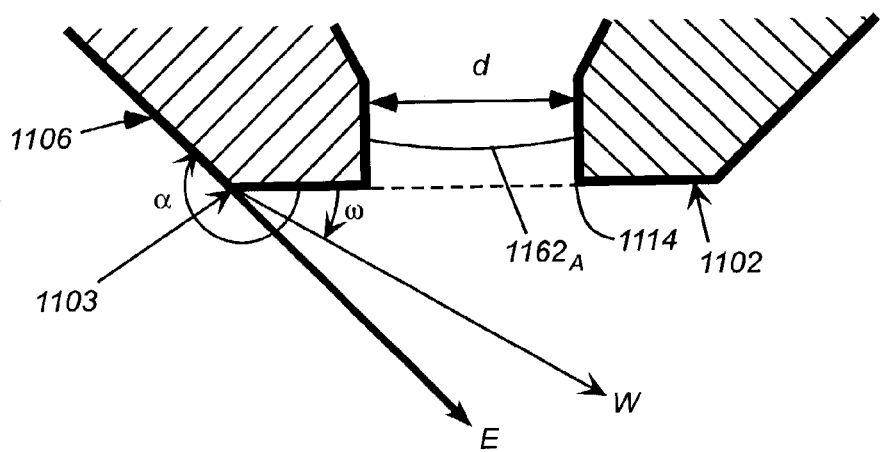
FIG. 11A is a schematic cross-sectional view of a positive pressure nozzle having a 225° outer edge angle, showing an early stage of meniscus advance, within a nozzle throat.
Figure 11B:
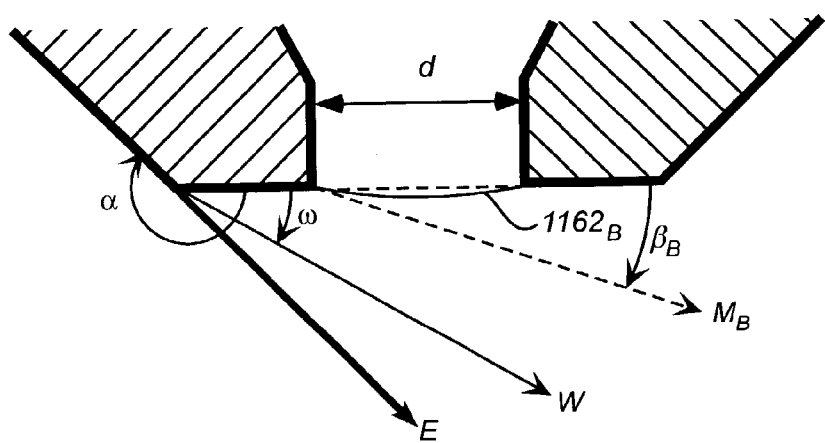
FIG. 11B is a schematic view of a nozzle such as is shown in FIG. 11A, showing a meniscus at the orifice.
Figure 11C:
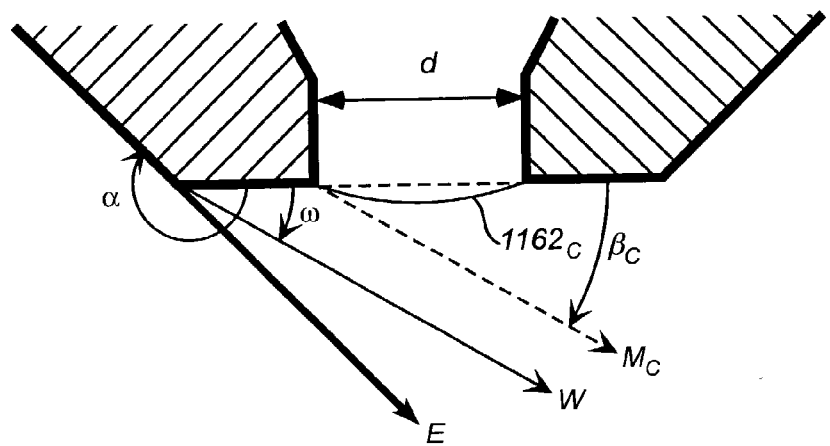
FIG. 11C is a schematic view of a nozzle such as is shown in FIG. 11A, showing a meniscus at the orifice, which has inflated.
Figure 11D:
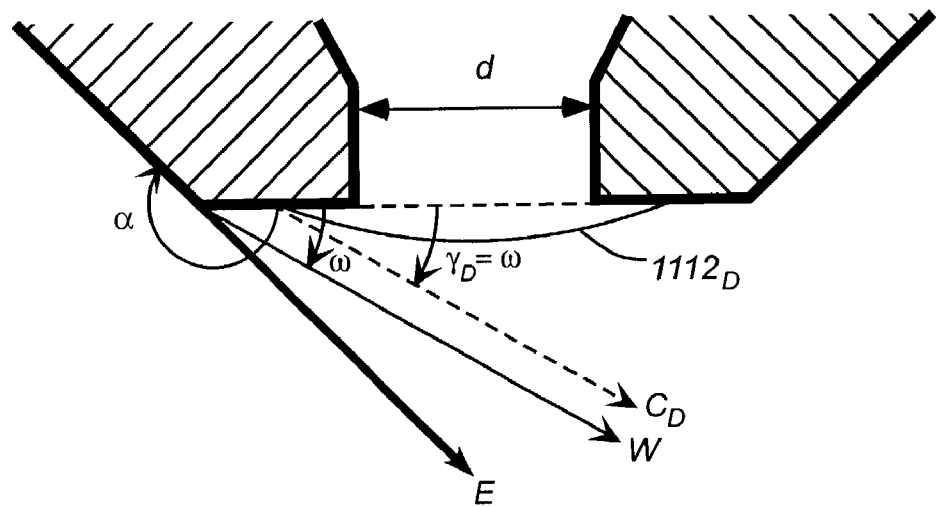
FIG. 11D is a schematic view of a nozzle such as is shown in FIG. 11A, showing a fluid cap that is wetting part of the land, in the process of moving radially outward.
Figure 11E:
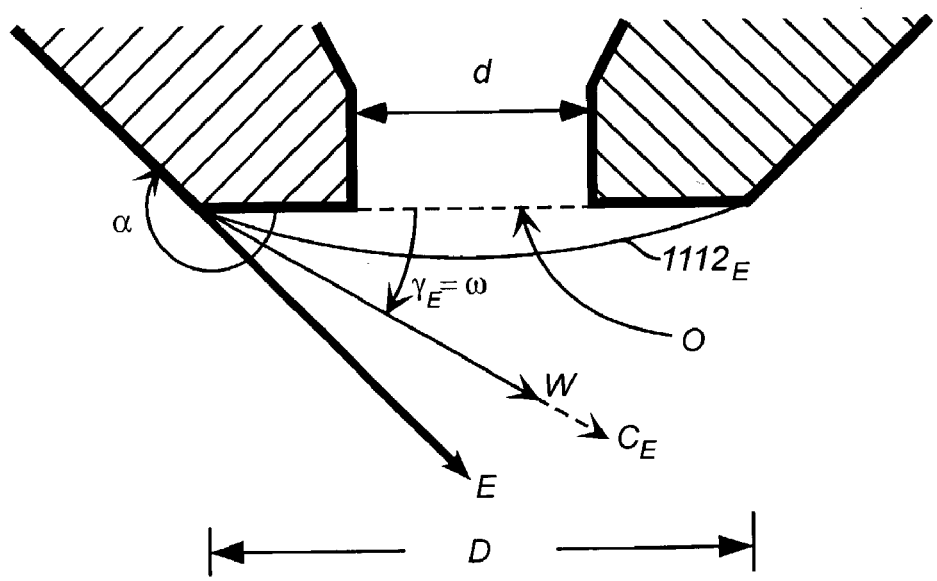
FIG. 11E is a schematic view of a nozzle such as is shown in FIG. 11A, showing a fluid cap that is wetting the entire land but not wetting beyond the land's outer edge.

FIG. 11A shows, schematically, a meniscus $1162_A$ that is not wetting the land (in the "throat" 1101), and FIG. 11E shows a meniscus $1112_E$ that is wetting the land. The meniscus $1162_A$ is shown only for explanation purposes. It would not be present in the equilibrium operation of representative apparatus. The meniscus $1162_A$ is as shown only transiently during set up. A feature of the inventions disclosed herein is to have the land 1102 covered with liquid during equilibrium. While the meniscus $1162_A$ is upstream of the orifice exit, surface tension and positive pressure will drive the meniscus towards the orifice exit 1114 regardless of the magnitude of the positive pressure.

FIG. 11B shows meniscus $1162_B$ at the orifice edge 1114, attached to the edge. The magnitude of the positive overpressure P over ambient is important to analyze this situation. In an equilibrium state, this positive pressure, supplied by the upstream fluid supply system (discussed below), is balanced at the binder-air interface by Laplace pressure. (In other words, the pressure caused by the surface tension of the meniscus equals the overpressure. Thus, the forces on the liquid in the cap are balanced and it remains in equilibrium, unmoving.)

The system typically operates with small droplets, and thus, for purposes of analysis, it is appropriate to consider the droplets to be shaped approximately as a section of a sphere. This is true if the effects of surface tension dominate relative to the effects of gravity. (By this dominance, it is also meant that the pressure at the bottom of the droplet cap be very close to equal to the pressure at the top of the droplet, right even with the orifice.) The following analysis is based on the assumption that the fluid cap is a spherical section. For very large drops, the essential teachings of the analysis are correct, although the mathematical approximations associated with the assumption of a spherical shape for the fluid cap are not exactly valid.

For positive pressure, the meniscus $1162_B$ bulges out from the orifice edge 1114 in a cap that is a spherical section. The balance of positive overpressure P over ambient and the pressure caused by surface tension σ, relative to air, determines the radius a of the spherical cap section. For a spherical section of radius a, the force from the positive pressure P and the force from the surface tension σ are given by $$P = \frac{2\sigma}{a}. \quad (1)$$

This Laplace relation holds for any spherical section cap meniscus.

For relatively larger equilibrium positive pressure, as shown in FIG. 11C, the meniscus is bulged out relatively farther $1162_C$. Relatively larger pressure results in a more bulged out meniscus, which has a smaller radius a (not shown) than a less bulged out cap (as shown in FIG. 11B). At larger pressures the binder fluid wets out onto the orifice land.

The angle β is the angle that the tangent to the droplet meniscus forms, relative to the plane in which the land lies. If β is larger than the wetting angle ω for the system, the meniscus $1162_2$ will detach from the edge 1114 and flow out onto the land 1102, forming a meniscus $1112_D$, which then moves out to form meniscus 1112E, as shown in FIG. 11E. The cap and meniscus will not retreat back into the orifice 1101, away from the land 1102. A low surface tension binder will wet the orifice land 1102 with relatively minimal pressure forcing.

For non-wetting systems, wetting of the orifice land 1102 must be more strenuously forced. A non wetting system can be transformed to a wetting one by an increase in the surface energy of the orifice land 1102, either by choice of materials or by surface treatment or by adding a surfactant to the liquid to lower its surface tension.

Regardless of the method of wetting the orifice land 1102, the equilibrium meniscus $1112_E$ locates itself at the outer edge 1103 of the land, forming a spherical section cap covering the entire orifice face.

The meniscus attaches to edge 103 because at this edge the meniscus is able to satisfy the wetting condition of the fluid with respect to the surface material. This may be understood by visualizing the edge with a finite radius q as shown in FIG. 1A. The liquid moves along this radius, from positions where the meniscus is inclined relative to the surface at less than the wetting angle, until it finds a position where the meniscus is inclined relative to the surface at the wetting angle.

The contact angle that the tangent C to the meniscus forms relative to the land, in any particular case, is designated herein as γ.

The positive pressure required to create a cap with a contact angle γ equal to the wetting angle ω relative to the plane of the orifice land O is the minimum overpressure $P_{min}$ to maintain the completely wetted orifice land 1102.

The minimum positive pressure $P_{min}$ to maintain a cap of liquid with surface tension σ is determined by the binder solution wetting angle ω with the orifice land 1102 and the radius $R_{land}=D/2$ of the orifice land, as follows:

$$P_{min} = \frac{2\sigma}{R_{land}} \sin(\omega). \quad (2)$$

The thickness (height) of the equilibrium cap $h_{cap}$ can be varied by adjusting the level of steady state positive pressure in the fluid 1101 at the orifice 1110. For operational reasons, explained below, it is desirable to be able to operate the system at any one of a range of different degrees of cap inflation. For a relatively thicker cap, the angle γ between the surface (plane O) of the orifice land 1102 and the tangent plane C to the meniscus 1112 at the orifice outer edge 1103 is relatively larger.

Figure 5A:
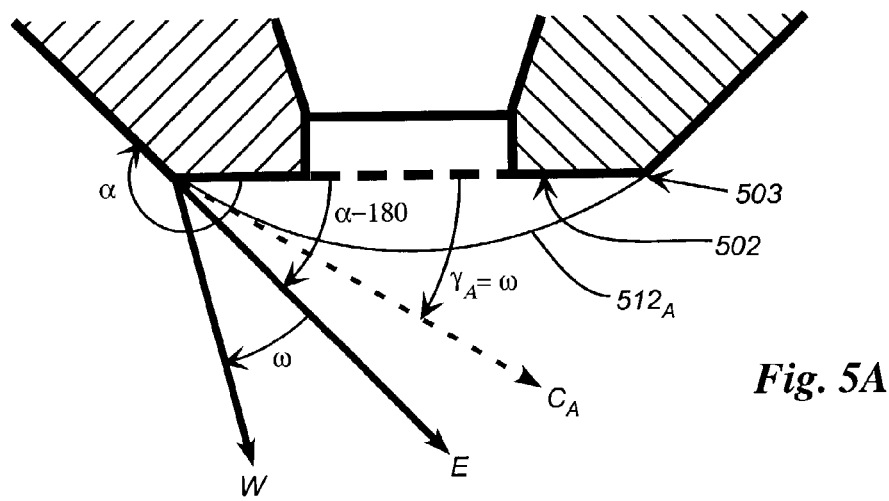
FIG. 5A is a schematic cross-sectional view of a positive pressure nozzle having an outer edge angle, of approximately 225° showing an inflated cap, and also representative nomenclature for different angular relationships.

For purposes of illustration, using FIG. 5A, it will be assumed that the natural wetting angle of the system ω is as shown, being formed by the meniscus $512_A$. (It should be understood that meniscus $512_A$ is shown only for illustration purposes. In actuality, any meniscus that is formed with a positive overpressure greater than $P_{min}$ would bulge out so that the angle γ formed would be larger than ω.) In general, the relation between the overpressure P and the contact angle γ, is $$P = \frac{2\sigma(\sin\gamma)}{R_{land}}. \quad (3)$$

Figure 5B:
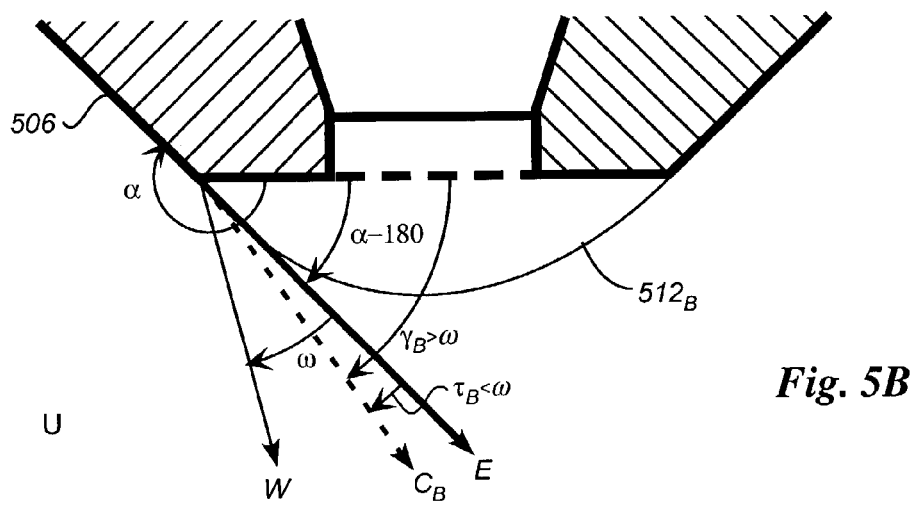
FIG. 5B shows a nozzle such as shown in FIG. 5A, with cap inflated to a larger degree than the cap shown in FIG. 5A.

Due to the edge 503, the liquid can form a meniscus as shown in FIG. 5B at $512_B$ whose tangent $C_B$ is angularly spaced away from the surface of the land 502 by a greater angular amount $\gamma_B$ than the system wetting angle, ω.

It is also helpful to know the angle that the meniscus forms, relative to an extension of the circumferential surface 506, from the corner 503. The extension is designated E herein. The angle is designated τ. It is measured from the extension E, in the same direction (clockwise as shown) as γ and ω are measured. In some cases, the extension plane E lies wholly outside of the meniscus, and thus, the angle τ is negative.

The angles α, τ and γ (measured in degrees) are related as follows:

$$\tau = \gamma - (\alpha - 180). \quad (4)$$

Figure 5C:
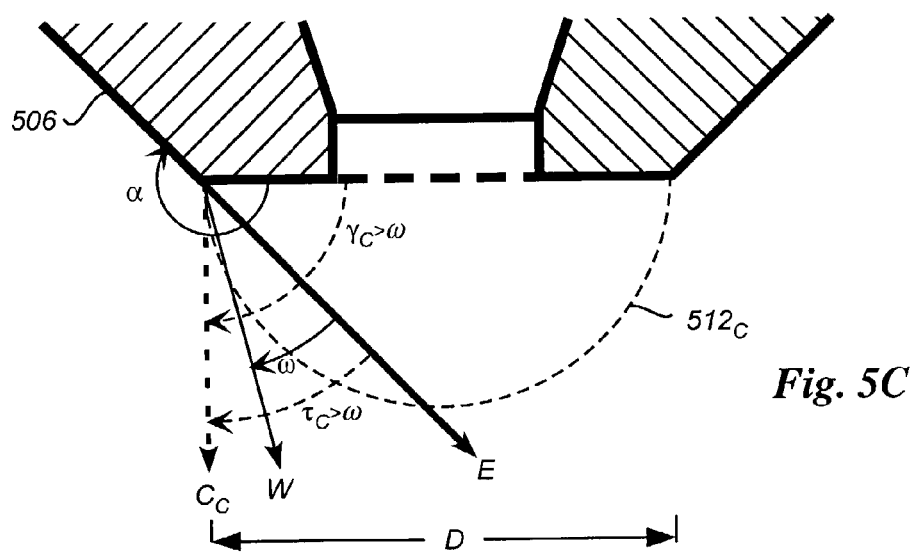
FIG. 5C shows a nozzle such as shown in FIG. 5A, with a cap inflated to a hemisphere.

The maximum pressure extreme for steady state pressure is explained with reference to FIGS. 5A, 5B and 5C. The following analysis is analogous (in part) to the analysis done to determine if fluid in the orifice throat 1110 will wet beyond the orifice edge 1114 over the land 1102, or stay only within the orifice 1110. To illustrate the angles for different situations, FIGS. 5A, 5B and 5C show three possible inflated caps having meniscii, $512_A$, $512_B$, and $512_C$, as might be produced by three different pressures, $P_A$, $P_B$ and $P_C$. The constant system wetting angle at ambient pressure, ω, is shown in each. The tangents $C_A$, $C_B$ and $C_C$ to the three caps, are shown, as well as the extension plane E (also a constant) to the circumferential edge 506. The menisci $512_A$ and $512_B$ present an angle $\tau_A$, $\tau_B$, respectively that is less than the wetting angle ω.

The meniscus $512_C$ presents an angle $\tau_C$ that exceeds the wetting angle ω.

There are two independent considerations that govern the maximum size of spherical section cap, and the maximum sustainable equilibrium overpressure. One set of consideration is based on wetting angles. The other is based on the Laplace Equation (Eq. 1) and pressure.

Turning first to a detailed explanation of the limit that relates to wetting angle, at ambient pressure, a tangent plane $C_A$ to the meniscus $512_A$ at the edge 503 would form an angle $\gamma_A=\omega$ with the plane in which the land 502 lies. Higher equilibrium pressure than ambient, as used in the present inventions, provide a relatively inflated cap, whose tangent $C_B$ to the meniscus $512_B$ (FIG. 5B) assumes a larger angle $\gamma_B>\omega$ with the plane of the land 502.

The circumferential surface 506 is inclined away from the land 502 surface. In general if τ for a given positive pressure P at the orifice, is less than the system wetting angle ω, $$\tau < \omega, \quad (5)$$

then the liquid will not wet beyond the edge 503, and the system can be successfully used at that pressure. Conversely, if a given pressure would produce a fluid cap that assumes an angle $\tau$ that exceeds the wetting angle $\omega$, then the fluid will wet beyond the edge, and the system can not be used at that pressure.

Combining Expression 5 with Eq. 4, relating the three angles, shows that for the system to be maintained without wetting the circumferential surface 506, $$\gamma < \omega + (\alpha - 180). \quad (6)$$

The angle $\tau_B$ between: the plane E, that is an extension of the circumferential surface 506 on the one hand; and the plane $C_B$ that is tangent to a meniscus $512_B$ at the land edge 503, is smaller than the system wetting angle $\omega$. Thus, the system can be successfully used at the pressure that gives rise to the meniscus $512_B$, even though it assumes a contact angle $\gamma_B$ that exceeds the system wetting angle $\omega$.

In contrast, the meniscus $512_C$ (FIG. 5C) presents an angle $\tau_C$ that exceeds the wetting angle $\omega$. Thus, the meniscus $512_C$ could not be maintained in an equilibrium situation. The liquid would not stop at the edge 503, but rather would wet over the edge, up along the surface 506, until the angle formed between the surface 506.

This wetting around the edge would occur at a pressure $$P_{maxwet} = \frac{2\sigma}{R_{land}} \sin(\omega + \alpha - 180). \quad (7)$$

Turning next to the pressure and Laplace equation limit, the absolute maximum equilibrium volume that the spherical section cap can assume is a hemi-sphere, having a diameter equal to the diameter D of the land 502. This is even so if a wetting angle analysis as above would permit a larger volume cap. The equilibrium pressure $P_{maxhemi}$ that is required to sustain such a hemi-spherical cap is $$P_{maxhemi} = \frac{2\sigma}{R_{land}}, \quad (8)$$

where $R_{land} = D/2$.

The maximum pressure $P_{maxhemi}$ can be more easily understood by considering a series of steady state pressure situations, starting from $P_{min}$ and increasing in steps to larger than $P_{maxhemi}$. Starting with an overpressure slightly greater than $P_{min}$ of Eq. 2, the fluid cap will fill progressively and, with stability, increase as the overpressure is increased. Once the overpressure exceeds $P_{maxhemi}$, the fluid cap will continue to fill, but without stability, until it is large enough to fall off the land or wet up the sides. As the fluid cap fills toward $P_{maxhemi}$, the radius a gets smaller and therefore the capillary pressure gets larger. However, beyond $P_{maxhemi}$ and the associated hemispherical fluid cap, the radius a gets larger and therefore the capillary pressure gets smaller, so the fluid cap continues to fill.

Theoretically, the steady state overpressure can be any pressure that is less than the pressure $P_{maxwet}$ that inflates the cap to the degree that the relevant $\tau$ exceeds the wetting angle $\omega$ as explained above, and which is also less than the pressure $P_{maxhemi}$ that would inflate the cap to be larger than a hemisphere.

Within this context, focusing first on the wetting angle limit, it can be seen from review of Eq. 6 that the edge angle $\alpha$, between the land surface 502 and the circumferential surface 506 plays a significant role. For relatively small edge angles $\alpha$, such as is shown in FIG. 5A, the degree to which the cap can be inflated beyond the minimum that will wet the land, without wetting around the edge 503, is relatively small. In contrast, the degree to which the cap can be inflated for relatively large angles $\alpha$ is relatively large. This is because, with a larger edge angle $\alpha$, the surface 506 that is to be maintained unwetted, is located a larger angular distance away from the surface of the meniscus 512 of any cap.

Figure 9A:
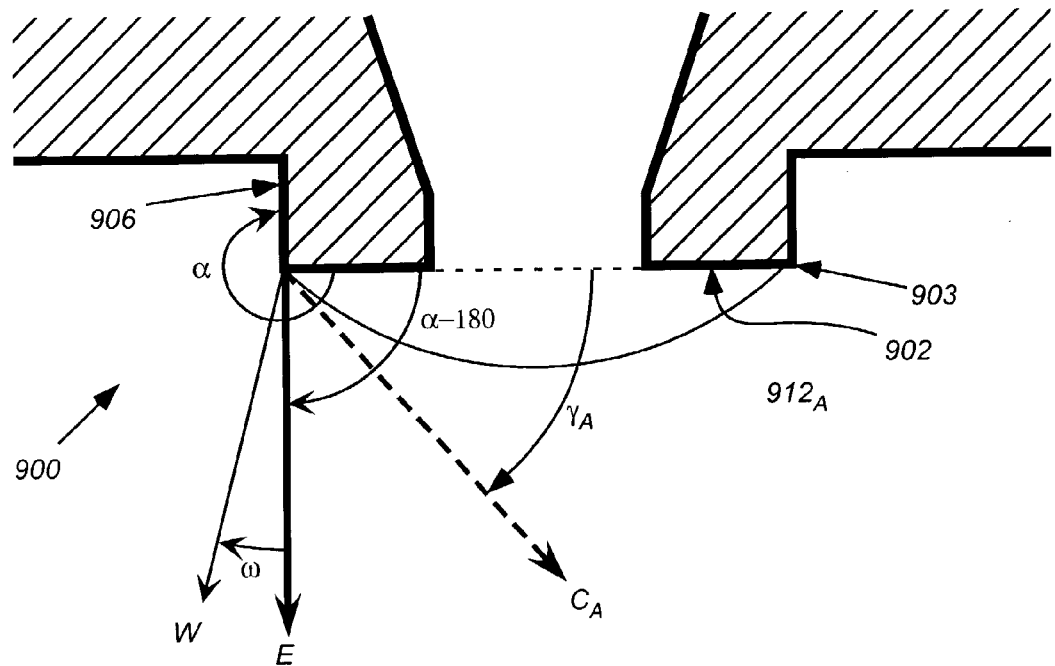
FIG. 9A is a schematic cross-sectional view of a positive pressure nozzle having a 270° outer edge angle, such as shown in FIG. 1A, showing an inflated cap.
Figure 9B:
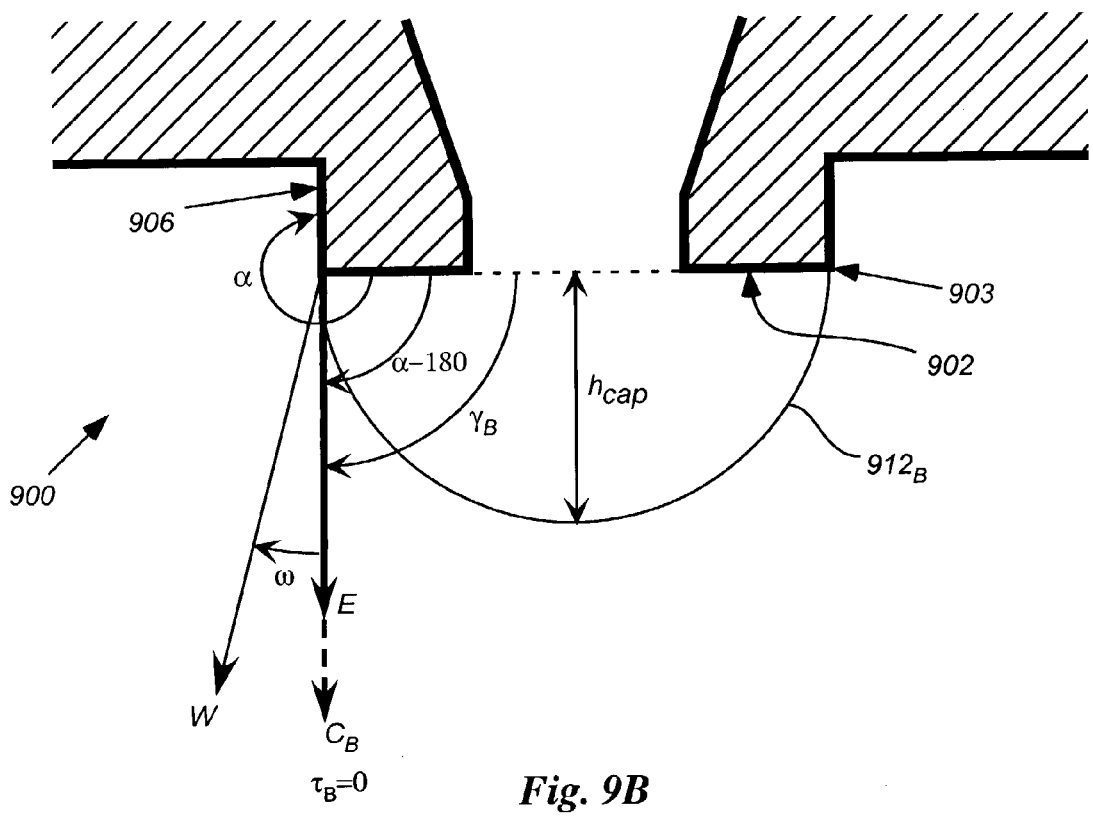
FIG. 9B is a schematic view of a nozzle such as is shown in FIG. 9A, with a cap inflated to a hemisphere.

Reference to FIGS. 9A and 9B shows how a larger edge angle $\alpha$, such as an angle of 270°, provides a much larger range for cap inflation. For the same size land, the minimum cap size, and pressure required to cover the land, is the same, regardless of the size of the edge angle $\alpha$. FIGS. 9A and 9B show two different degrees of cap inflation, represented by menisci $912_A$, $912_B$. The system wetting angle is $\omega$, shown to be about thirty degrees, the same as in FIGS. 5A–5C. The meniscus $912_A$ represents a cap of size smaller than a hemisphere. The meniscus $912_B$ represents a cap approximately equal to a hemisphere.

The surface 906 is the surface which is to be maintained unwetted. For a droplet to not wet the surface 906, the degree of cap inflation must remain small enough so that an angle $\tau_x$ from a tangent $C_x$ of a meniscus $912_x$ to the extension E of the surface 906, is less than $\omega$.

Thus, the meniscus $912_B$ (FIG. 9B), which is a hemisphere, would not wet around the edge 903, because $\tau_B = 0$. Any smaller meniscus, such as $912_A$ would also be stable because $\tau_A$ is negative. Thus, the system could be operated at any pressure up to that which would produce the hemispherical cap $912_B$. In comparison to FIGS. 5B and 5C, it can be seen that for a system having the same wetting angle $\omega$, a much larger volume cap can be sustained with the larger outside edge angle $\alpha$ shown in FIG. 9B. The cap also has a thicker depth $h_{cap}$.

For a boss nozzle such as is shown in FIG. 9B, it is always true that the pressure/hemisphere limit will be reached before a wetting angle failure is reached (assuming ideal conditions). This is because the tangent to a hemispherical meniscus (such as $912_B$) is coincident with the extension E of the circumferential surface 906. As discussed above, the wetting angle limit is reached if an angle $\tau$ from the surface extension E to the tangent C exceeds the wetting angle $\omega$. But, for a boss nozzle as shown in FIG. 9B, and a hemispherical cap, $\tau_B$ (not shown) would be zero. Since a cap larger than a hemisphere can not be stable for other reasons, there can be no cap that corresponds to an angle $\tau$ that exceeds the wetting angle $\omega$.

The maximum positive pressure $P_{max}$ that can be maintained without weeping beyond the outer edge 503 depends also to a practical extent on the sharpness of the outer edge. The certainty of small chips or other flaws limit the maximum spherical cap size. Usually, in practice, the maximum sustainable pressure is less than the theoretical limits relating to a hemispherical cap, or the wetting angle $\omega$, as the case may be, due to these edge quality considerations. For the same reason, the volume of the cap is also less than the maximum that would correspond to the theoretical maximum pressures.

Between the pressure extremes (Expressed above in Eq. 2, Eq. 7 and Eq. 8) the orifice and land is completely covered by a semi-spherical section liquid cap. The maximum thickness of the cap (at the center) can be set by varying the positive pressure. Assuming a spherical section cap governed by the Laplace pressure condition and using geometric relations, the thickness $h_{cap}$ of the cap, shown in FIG. 11E, depends on the liquid surface tension relative to air σ, the positive over pressure P, and the outer edge $R_{land}$ radius, as follows:

$$h_{cap} = \frac{2\sigma}{P} - \sqrt{\frac{4\sigma^2}{P^2} - R_{land}^2} \quad (9)$$

This cap thickness $h_{cap}$ affects drop formation in several ways. Generally, it is beneficial for the cap not to be too thick. If it is too thick, it may be difficult for a drop to be ejected to penetrate through the thick cap. A reasonable operating positive over pressure is usually the minimum over pressure necessary for complete wetting of the orifice land, plus enough of a margin to ensure complete wetting even for some variation of other parameters. If the orifice land is large enough that significantly large surface waves can arise (see below), a relatively lower pressure (thinner fluid cap) will reduce the potential wave effect because the waves will damp out faster.

Thus, it can be seen that a relatively larger outer edge angle α that permits a wide range of cap inflation is useful, because the system can be operated at equilibrium with the land entirely wetted, without risking going higher than either of the maximum overpressure limits discussed above, with respect to wetting angle or the Laplace equation.

Returning now to a more detailed discussion, important features of the orifice 110 and land 102 include: that it sufficiently constrain and define the drop size, and that it provide proper wetting conditions for at least one particular binder material system. It should also interface with the rest of the nozzle and printhead to allow an uninterrupted internal fluid path, ease of assembly and disassembly, ease of cleaning, long-term mechanical robustness, and resistance to any solvents used in binder solutions.

Figure 2:
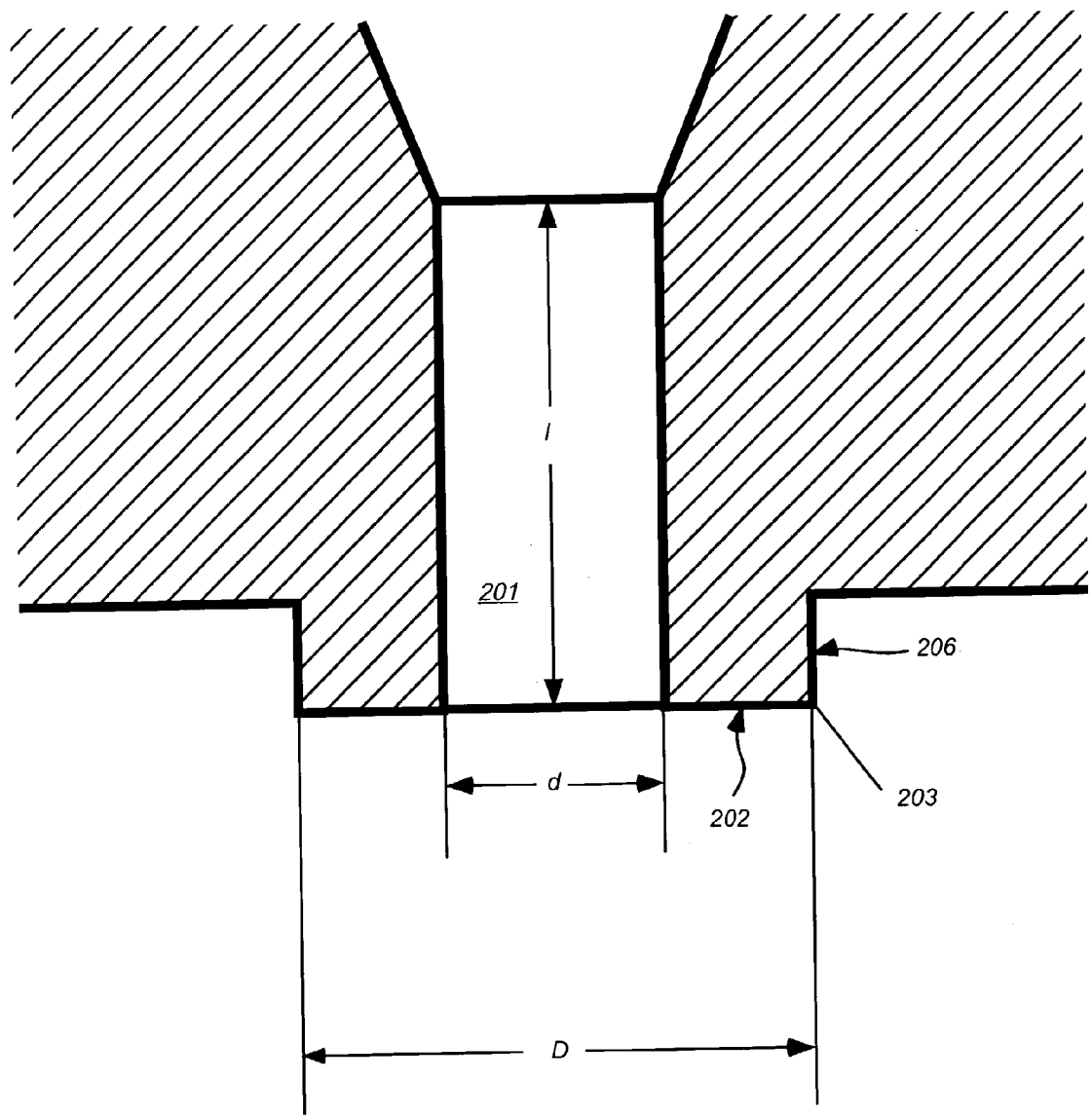
FIG. 2 is a schematic cross-sectional view of a positive pressure nozzle having a relatively long throat, as compared to its orifice diameter.

As shown in FIG. 2, the throat 201 of the orifice has a length l. The throat length is usually scaled with the orifice diameter d, so that the ratio l/d is approximately unity. A short throat length, with ratio of l/d as much less than 1:1 as fabrication techniques allows, ensures that viscous effects are relatively small and is preferred. A relatively long throat as shown in FIG. 2 is less desirable because of significant viscous drag effects.

Figure 3:
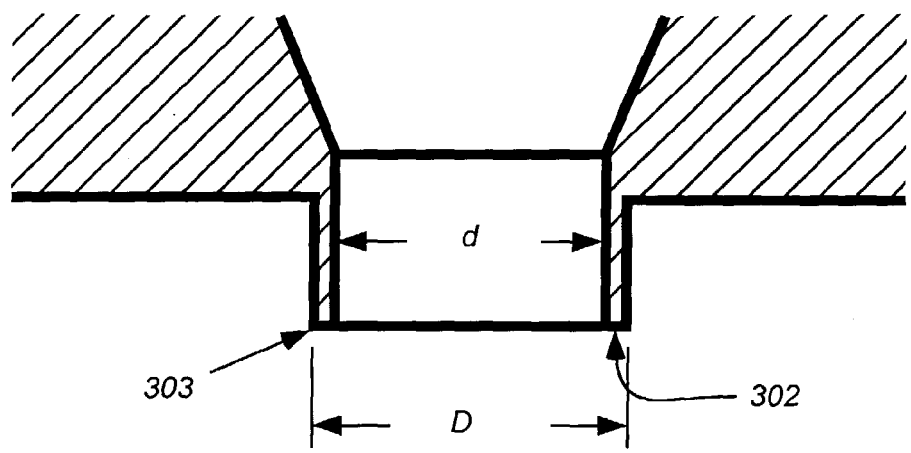
FIG. 3 is a schematic cross-sectional view of a positive pressure nozzle having a relatively thin annular land, as compared to its orifice diameter.

As described above, it is desirable to have a thin cap of fluid 108 covering the orifice 110 and the surrounding land 102. The thickness $h_{CAP}$ of the fluid cap is determined by both the positive pressure (discussed below) and the orifice geometry. For a given orifice diameter d, there are a range of orifice land sizes that will work well to constrain wetting. An absolute lower bound on the outer edge diameter D is the orifice diameter d. FIG. 3 shows an embodiment with the outer orifice edge diameter D only slightly larger than the orifice diameter d. Available fabrication techniques determine the actual minimum orifice land 302 width (D−d)/2.

On the other extreme, several detrimental effects arise unless diameter D is significantly smaller than one millimeter, and in particular smaller than 300 μm or less with a preferred range being smaller than about 100 μm.

Figure 4:
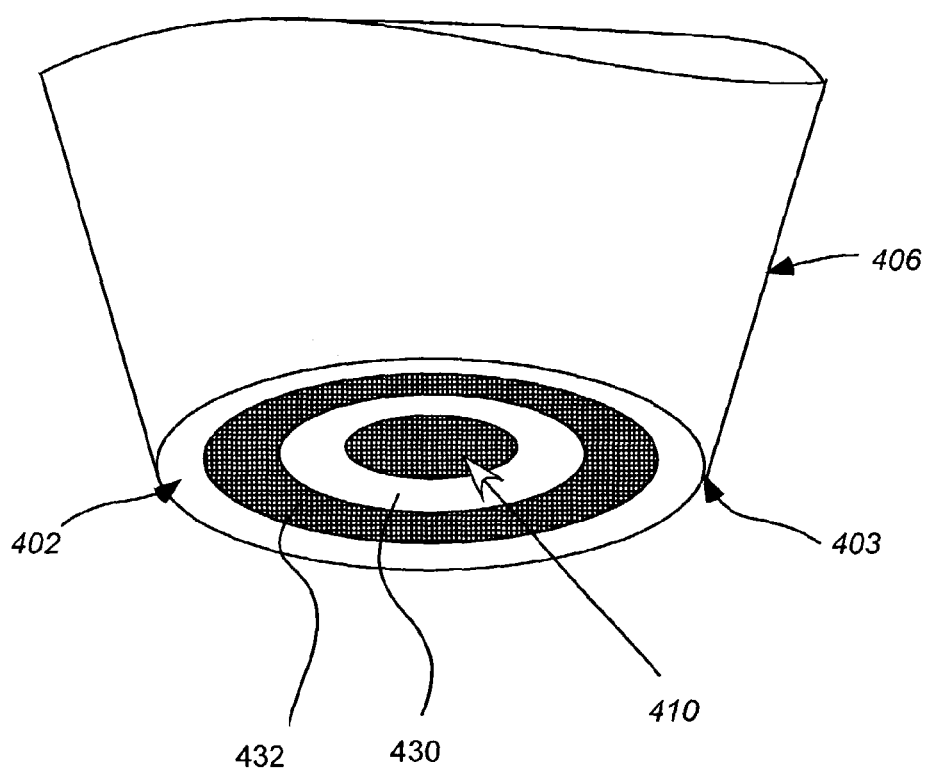
FIG. 4 is a schematic representation of a positive pressure nozzle having a relatively wide land, as compared to its orifice diameter, showing surface waves in the meniscus.

A small orifice diameter d and a large outer edge diameter D make a large land 402, as shown in FIG. 4. A large land 402 means that only a limited range of positive pressures can be used. This is because, for a given overpressure, the cap thickness will be relatively greater than it would be for a relatively smaller edge diameter. (See Eq. 7). Thus, for larger outer diameter, the range of pressures that are useable, above $P_{min}$, is smaller, because the pressure that generates a cap that is just too thick, will be smaller for a large outer diameter, than the pressure for an equal cap thickness for a smaller outer edge diameter. Thus, the range of pressures between $P_{min}$, and one that produces a cap that is not too thick, is smaller for larger outer edge diameter.

Further, for a thin fluid cap, complete wetting of a large land 402 is not always guaranteed. There may be dry spots, or the fluid cap may not extend all the way to the outer edge, resulting in a poorly defined boundary and unreliable drop forming conditions.

Finally, with a large outer edge diameter D, relatively low frequency surface waves in the cap would very likely interrupt drop formation at drop formation rates well below the upper limits imposed by the rest of the system (as discussed below). A wave crest 430 and a wave trough 432 is shown schematically in FIG. 4.

With the land at about 100 μm the land can be fully wetted, and the cap can be sufficiently thin over a large range of overpressures, so that a droplet can be reliably ejected through the cap. A representative land has an outer diameter of about 90 μm.

It is believed that the outer edge diameter can be as small as can be fabricated, for instance, even about 40 mm, without experiencing any deleterious results.

An important feature of the positive pressure orifice geometry is the angle α at the outside edge Various tradeoffs allow for a range of appropriate angles.

The minimum outside edge angle required to define any edge is just over 180 degrees (which would be a flat plane), and the maximum theoretical angle is just less than 360 degrees (which would be a severe sharp knife edge). Even a small (near to flat) angle can be an effective wetting boundary. However, it does not leave much of a margin for error in the degree of cap inflation, as discussed above, such as chloroform, water and isopropyl alcohol.

Figure 6:
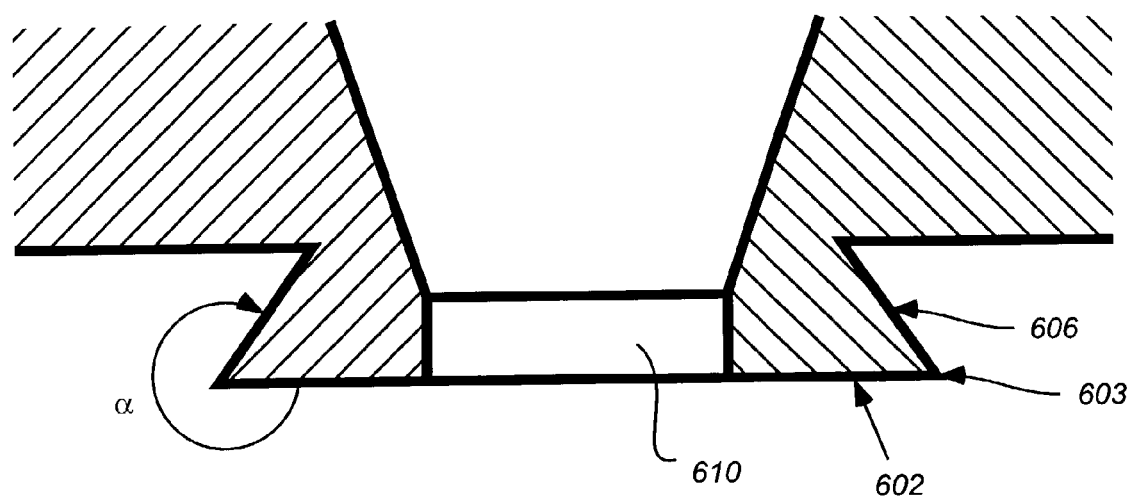
FIG. 6 is a schematic cross-sectional view of a positive pressure nozzle having a relatively large outer edge angle, of approximately 305°.
Figure 7:
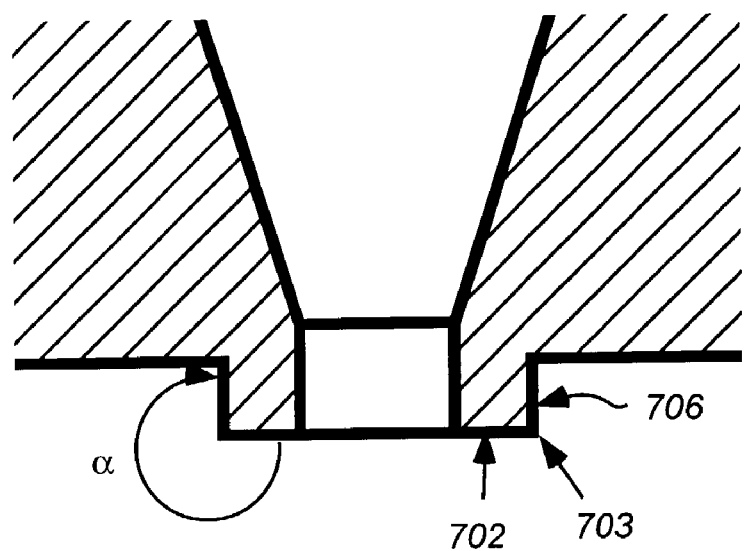
FIG. 7 is a schematic cross-sectional view of a positive pressure nozzle having a 270° outer edge angle, such as shown in FIG. 1A, without a fluid cap.
Figure 19:
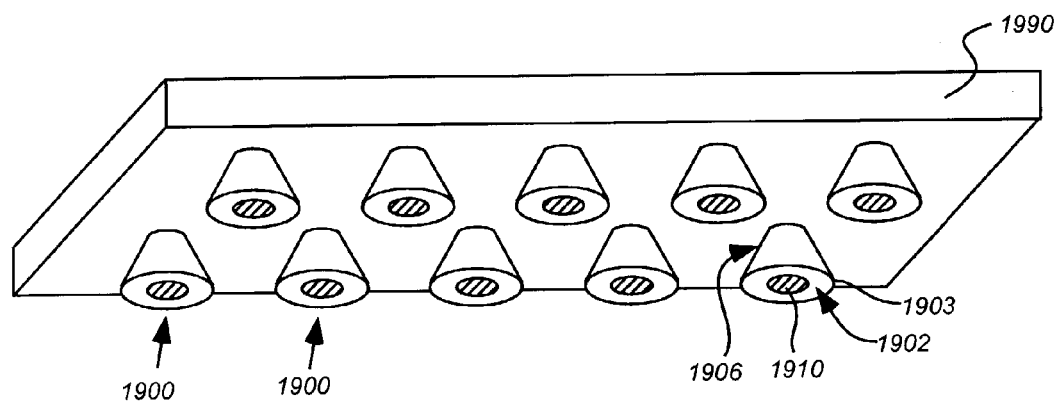
FIG. 19 shows, schematically, a printhead with an array of nozzles having an outer edge angle of greater than 270°.
Figure 20:
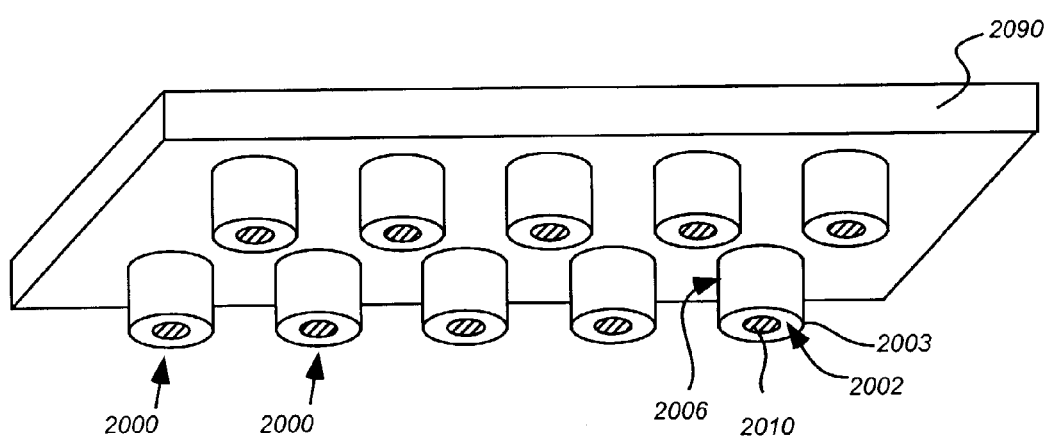
FIG. 20 shows, schematically, a printhead with an array of nozzles having an outer edge angle of approximately 270°.

Durability and fabrication considerations limit the maximum angle (sharp edge) to well less than 360°, although angles even as great as about 315° are possible (as for example, by the undercutting action of some etching techniques). Such a sharp outer edge angle α, with substantial undercut, is shown in FIG. 6 at 603 (α is approximately 305°), and FIG. 19 at 1903. In general, edge angles α of between about 225° and about 270° are suitable for many liquids, with approximately 255° being very advantageous for many useful liquids.

A purpose of the outer edge 103 is to provide a well-defined boundary for the orifice land 102 beyond which the binder fluid will not wet. In addition to the importance of the size of angle α of the outside edge, discussed above, the quality of the edge (sharpness) is also important. By sharpness, it is meant the size of the radius q of curvature in the immediate vicinity of the edge 103, with a smaller radius being associated with a sharper edge (FIG. 1A). As shown in FIG. 1A, the radius q on the outer edge should usually be significantly smaller than the outer radius D/2 of the orifice land. Typically, the ratio 2q/D<0.1 and preferably 2q/D<0.01.

In general, a larger edge angle α provides more margin for cap inflation but it is more difficult to fabricate and maintain. Similarly, in general, a sharper angle (radius q) will result in relatively less excursion of the meniscus perimeter as it oscillates outward and inward due to small fluctuations in pressure in the cap. Less excursion results in less surface area that may dry out from time to time, and thus, less likelihood of building up film and debris. For this reason, smaller radius q is better. But a smaller q (sharper corner) is also more difficult to fabricate and maintain. Thus, in many brittle materials, a sharper edge (radius q) at a higher angle α leads to higher likelihood of chipping, both in manufacture and in handling. A chip in an edge can provide a location beyond which the fluid can wet.

The foregoing discussion has assumed that the land 102 lies in a flat plane. This is likely the most typical situation, but need not be. The land can form a frusto-conical surface, with a surface that is inclined to the axis A. The surface can assume other shapes also. Rather than being frusto-conical, with straight, but inclined sides, it can be convex outward, with curved surfaces, such as a portion of a sphere, or another convex outward facing surface. Basically, any surface shape will be suitable.

As described above, the geometric tolerances for many embodiments of positive pressure printhead nozzles are somewhat demanding on a relatively small scale. For this and several other reasons, the material choices for these nozzles are limited. The nozzle material should be quite hard, to be resistant to wear from handling and fluid flow. However, it should not be so brittle that chipping results from the fabrication process or from regular handling. The nozzle material should be dimensionally stable over time and operating conditions, including the flow of binder fluids. A material that swells due to contact with any binder solutions is not dimensionally stable.

Other interactions between nozzle material and binder fluids are important. Any nozzle material that is not resistant to binder solvents will have a short useful lifetime. For example, composites bonded with epoxy will fail when printing chloroform, because the binder will gradually dissolve the nozzle. Corrosion and resulting wear of cobalt in tungsten carbide nozzles severely limit the useful life of such nozzles with water-based binder fluids.

Further, the nozzle material determines, in part, the wetting angle of the meniscus over the orifice land for each binder solution. Nozzle materials that are less wetted (higher wetting angle) by an intended binder solution allow a larger volume cap to form before weeping over the outer edge occurs, but require a larger minimum volume cap size to maintain a fully wetted orifice land. On the other hand, more wettable materials, which have a lower contact angle, allow a very small volume spherical cap to entirely wet the orifice land.

Thus, preferred materials have high surface energies so that liquids will wet them well. Examples include alumina and glass. Suitable polycrystalline alumina nozzles are available on a custom basis from Gaiser Tool Company (Ventura, Calif.). Tools similar to this are made by Gaiser for use as vacuum pick-up tools in the electronics industry.

Suitable materials may also include some ceramic-metal composites and several other hard metals. While alumina is electrically insulating and many metal containing materials are electrically conductive, printhead design can accommodate both cases.

Nozzles may be fabricated of other ceramic materials using pressing and sintering methods known in the art, followed by grinding and polishing for finish.

Lower cost nozzles may also be fabricated by molding methods, including transfer molding and injection molding of polymers. In these cases, polymers with relatively high surface energies should be chosen, although in general the surface energies would be lower than found with ceramic materials. Ultem™ and PEEK are suitable candidates. Ultem™ is a product sold by General Electric, which is a polyetheimide. PEEK is a high temperature resistant engineered thermoplastic, which is a semi-crystalline polyetheretherketon.

The orifice face itself can be smooth. It can also be textured, which has the potential to be better wetted than a smoother surface. However, textured surfaces also have the potential to become dirty and encrusted, which would alter their performance. To achieve a suitable surface finish, polishing of the orifice land should be accomplished while maintaining a relatively sharp outer edge.

As another important feature, provision must be made for attachment of the nozzle to the rest of the printhead assembly. The interface should be durable, secure, airtight, and consistent, leaving a minimum of edges and corners to which air bubbles might attach.

Another important set of parameters in the operation of the positive pressure printhead determines the quality of drop formation: the waveform applied to the piezo-electric actuator. The foregoing discussion has focused on the constant pressure equilibrium state of the fluid at the orifice without any drop formation excitation. Drop formation is dynamic and requires a sudden change in pressure at the orifice 110. This sudden pressure change can be accomplished by various means, such as piezo-electric element upstream of the orifice. A sudden change in shape of such a piezo element creates a pressure wave that travels through the binder fluid to the orifice, where, under the right conditions, a drop can be ejected.

Other types of excitation devices can be used. For instance, a large class of printers uses a device that heats the fluid to cause a rapid boiling of the fluid, which results in ejecting a droplet. These printers are typically referred to as evaporative bubble, or thermal inkjet printers. A magnetostrictive actuator may also be used.

At this point, an overview of representative supply and excitation pressure apparatus for use with a positive pressure nozzle is helpful.

Figure 12:
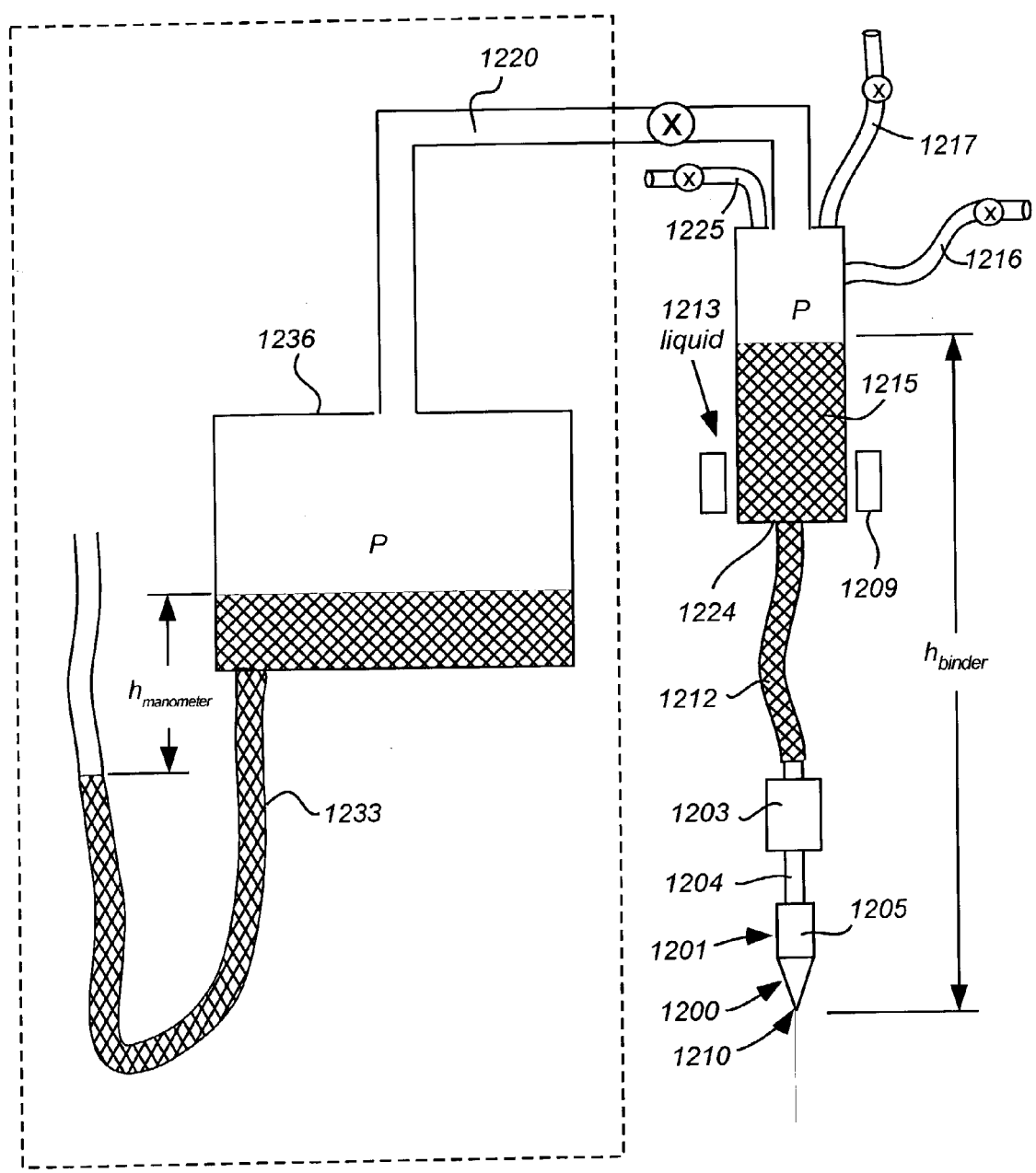
FIG. 12 is a schematic rendition in block diagram form, showing a printhead, fluid supply, and pressure adjustment components for use as a positive pressure liquid dispensing apparatus.

FIG. 12 shows schematically a possible embodiment of an apparatus for providing steady state pressure. A nozzle 1200 has an orifice 1210 from which droplets are ejected. The nozzle is coupled to a conduit 1204 upstream of the nozzle 1200 by a coupling 1205. An excitation unit 1203, for instance a piezoelectric crystal, is coupled to the conduit 1204, so that when energized, vibrational energy is transmitted to fluid in the orifice 1210. A reservoir 1213 is coupled hydraulically through a conduit 1212 to the conduit 1204, and thus the fluid in the orifice 1210. As explained below, the reservoir is provided with a quantity of fluid 1215, which provides a pressure head, that establishes the steady state positive pressure discussed above. The nozzle and piezoelectric elements are shown in larger detail in FIG. 13.

The motion of the piezo 1203 is related to a change in electric field across its electrodes, which is generated by a drop-ejection waveform applied to the electrodes, as determined by a controller, not shown. For purposes of this discussion, a positive change in applied voltage creates a positive pressure change in the binder fluid at the orifice, and a negative change in the voltage creates a negative pressure change in the nozzle. For example, a sufficiently large positive waveform step should generate a large enough pressure wave in the orifice liquid to eject a single drop from the orifice 1210.

Any applied pressure wave will be added to or subtracted from the steady state positive pressure supplied as discussed above, for instance, by a reservoir 1213. However, only a rapid change in pressure associated with the waveform applied to the piezo 1203 makes a difference for drop ejection; the steady state positive pressure determines the meniscus condition at the orifice before drop ejection occurs.

Induced pressure waves travel in both directions from the piezo 1203. They reflect from the orifice 1210, the supply side of the printhead body (near the end of the conduit 1212), and any other abrupt changes in the fluid path. These reflections can be used to amplify the pressure change by sending a reinforcing wave at the right time so that it adds with a reflected wave (see Wallace, David B. "A Method of Characteristics Model of a Drop-on-Demand Ink-Jet Device Using an Integral Method Drop Formation Model," American Society of Mechanical Engineers # 89-WA/FE-4, 1989, for example). A typical drop-ejecting pulse can be generated in this way by first sending a negative pressure wave, which reflects as a positive wave, and then reinforcing this positive wave with another positive wave. The time between sending the negative wave and sending the reinforcing positive wave is given by the time it takes the negative fluid wave to travel to the point of reflection and back. The specific geometry of the system being used will determine where reflections occur, their magnitude, and other characteristics. The point being made here is that the designer should take into account such reflections, and may be able to take advantage of them also. This method amounts to first expanding the piezo (negative pressure wave), holding, then contracting (positive pressure wave).

Figure 14:
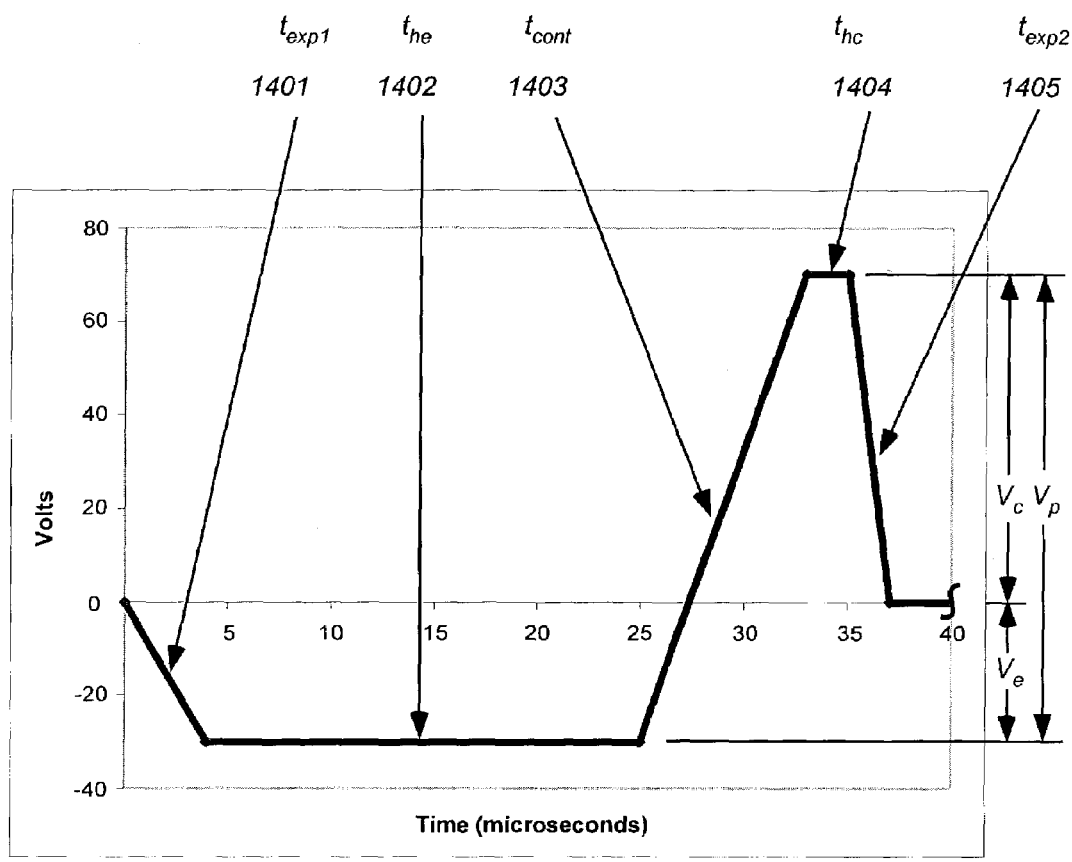
FIG. 14 is a graphical representation showing excitation voltage to a piezoelectric actuator, vs. time, for a typical cycle of drop ejection and hold between drops.

A typical waveform that generates these piezo geometry changes is shown in FIG. 14. Indicated are the parts of waveform that correspond to an initial expansion 1401 of the piezo, the expansion hold time 1402, drop-producing contraction 1403, contraction hold time 1404, and final expansion 1405 back to an un-excited state. Also indicated is the total peak-to-peak voltage $V_p$, and the compression $V_c$ and expansion $V_e$ components.

In Drop-on-Demand printing, it is almost always desirable to eject a single drop only, without creating additional droplets (satellites). To this end, the length of the ejected fluid column should be kept as short as possible. Longer fluid columns are more likely to break up into several drops, rather than coalescing into a single one. The final form of an ejected column also depends on the relative velocity of the leading portion and trailing portion of the column. That is, if the trailing portion of the column has a higher velocity than the leading portion, the trailing portion will overtake and merge with the leading portion before breaking up into two or more drops.

An important parameter of the waveform applied to the piezo is the voltage waveform. Velocity of the drops can be directly controlled by varying $V_c$ and $V_e$, keeping their ratio fixed. The relationship of velocity to $V_c$, $V_e$, and their sum, is linear over a broad range of drop velocities.

Drop size is very significantly determined by the orifice size, but it can be varied within a narrow range by adjusting waveform parameters. The drop size varies with the peak-to-peak voltage, although not as strongly (shallower slope) as does the velocity. An increased voltage generates a larger drop. The transition times (pressure pulse lengths) 1401, 1403, 1405 vary the drop size as far as they vary the ejected fluid column length.

An ideal Drop-on-Demand printhead ejects a drop whenever an appropriate waveform is sent by a controller to the actuator (piezo, for example). Each drop should be independent of the drops produced before and after it, and each should have the same properties regardless of the time elapsed between drops.

The upper limit of frequency has been passed if the drop waveforms overlap each other.

This limit is rarely reached. Instead, other effects limit the upper end of the true Drop-on-Demand frequency range to much lower drop ejection frequencies. In fact, drop generation at a frequency near any resonant frequency of the system will result in a distorted Drop-on-Demand. Such resonant features include meniscus oscillations, mechanical vibration of the printhead, and internal fluid reflections from various fluid path interfaces. These reflections and resonances are at relatively long distances and relatively long time scales, and have the greatest effect, not on the current drop ejection, but on subsequent drops. In other words, the reflections that are generated by a given piezo burst affect droplets that emerge as the result of a subsequent burst. Such "long" reflections are distinct from the "short" reflections discussed above, which have an immediate effect on the droplet ejected as a result of the same piezo burst.

When a drop is ejected, the breakoff event leaves the remaining meniscus in a high-energy state. As the meniscus returns to its lowest-energy steady state, it undergoes a damped oscillation. Attempts to eject another drop before the meniscus has returned to steady state will result in various levels of altered performance, depending on where in the oscillation cycle the next drop ejection pulse comes. The frequency of such meniscus oscillations is related to the liquid surface tension relative to air $\sigma$, density $\rho$, and a length of the scale of the orifice radius. The level of damping is determined by the fluid viscosity. As an example, it has been observed that for a system using water, having $\sigma=0.07$ Nt/m and $\rho=1000$ kg/m$^3$, with an orifice diameter d=40 μm, and a land diameter D=90 μm, the meniscus oscillation was approximately 14 kHz.

For larger orifice lands in which the ratio of outer land edge diameter D to orifice diameter d is much greater than one (approximately five or more), the meniscus has a more complicated motion after drop ejection. Rather than triggering a simple in-and-out oscillation of the entire liquid cap, drop ejection causes a series of surface waves on the much larger meniscus. Such waves are shown schematically with reference to FIG. 4. These waves 420, 422 (crests) 421, 423 (troughs) travel out from the center 424 of the meniscus 412, where the drop breakoff occurs, and then reflect from the edge of the fluid (typically at the outer edge 403) cap back towards the center. These waves take longer to damp out than the rapid oscillations associated with a smaller meniscus, and thus limit the upper drop formation frequency more severely, especially for a thick (deep) fluid cap, which sustains surface waves longer.

Depending on the particular printhead construction, mechanical resonances of the pressure wave actuator housing might be on a scale that interferes with drop formation. Usually, these mechanical vibrations are at a higher frequency, and damp out faster, than drop ejection frequencies. However, they are occasionally relevant on the individual drop-formation waveform ("short") scale.

Another system resonance includes all fluid reflections from farther upstream in the binder supply path than the nozzle entrance. These long upstream reflections appear to have their most significant effect on subsequent drop formation. The pressure wave generated by the actuator (piezo, for example) travels both upstream and downstream. The downstream wave ejects a drop (usually after one short reflection). Most of the upstream wave is dissipated, but reflections of that wave will reappear in the nozzle after a delay. The length of the delay is determined by the distance $L_{reflection}$ the wave travels before encountering supply tube connections or other abrupt fluid path transitions. The reflection that travels at speed $c_s$ the farthest without damping out before returning to the printhead will be most likely to interfere with the a subsequent right drop formation sequence. That reflection will limit effective drop formation to frequencies $f_{drops}$ less than an inferred reflection frequency $f_{reflection}$.

$$f_{drops} < f_{reflection} = \frac{2L_{reflection}}{c_s} \qquad (10)$$

If drop ejection frequencies approach any of these resonant frequencies, uniformity of drops cannot be assured, even for small changes in drop frequency, and the printhead will no longer be operating in ideal Drop-on-Demand mode. For example, for a representative system, drop velocity will vary substantially with frequency when operating outside the true Drop-on-Demand range, as shown in FIG. 16. In ideal Drop-on-Demand range 1601, the ejection of each drop is independent of the drops before and after it, so the drop velocity (vertical axis) remains constant over a wide range of drop frequencies. For drop frequency in a range 1602 above the true Drop-on-Demand range, a variety of resonance features of the system cause drop ejections to affect each other in constructive and destructive modes that are highly frequency dependent, as indicated by the variations in drop velocity.

On the other extreme, low frequency drop formation should be possible with only one major limitation: evaporation of binder fluid at the orifice. For binders with polymers or other dissolved or suspended solids, evaporation of the solvent will quickly change the concentration of solids at the orifice. To the extent that this change in concentration affects the fluid properties (viscosity and surface tension) of the binder, predictability of drop formation will suffer. In addition, any polymer skin or precipitates that develop will hinder drop formation. Solid deposits around the edge 114 of the orifice affect the wetting characteristics of the orifice and land 102 so that control over drop ejection capability degrades. The use of humectants to decrease the evaporation of solvent may increase the maximum idling time between drops.

Normally, the lower limit of drop frequency is far lower than desired printing frequency. However, this lower limit does set the maximum printhead static time, which may be for some loaded materials on the order of ten to one hundred seconds.

Figure 13:
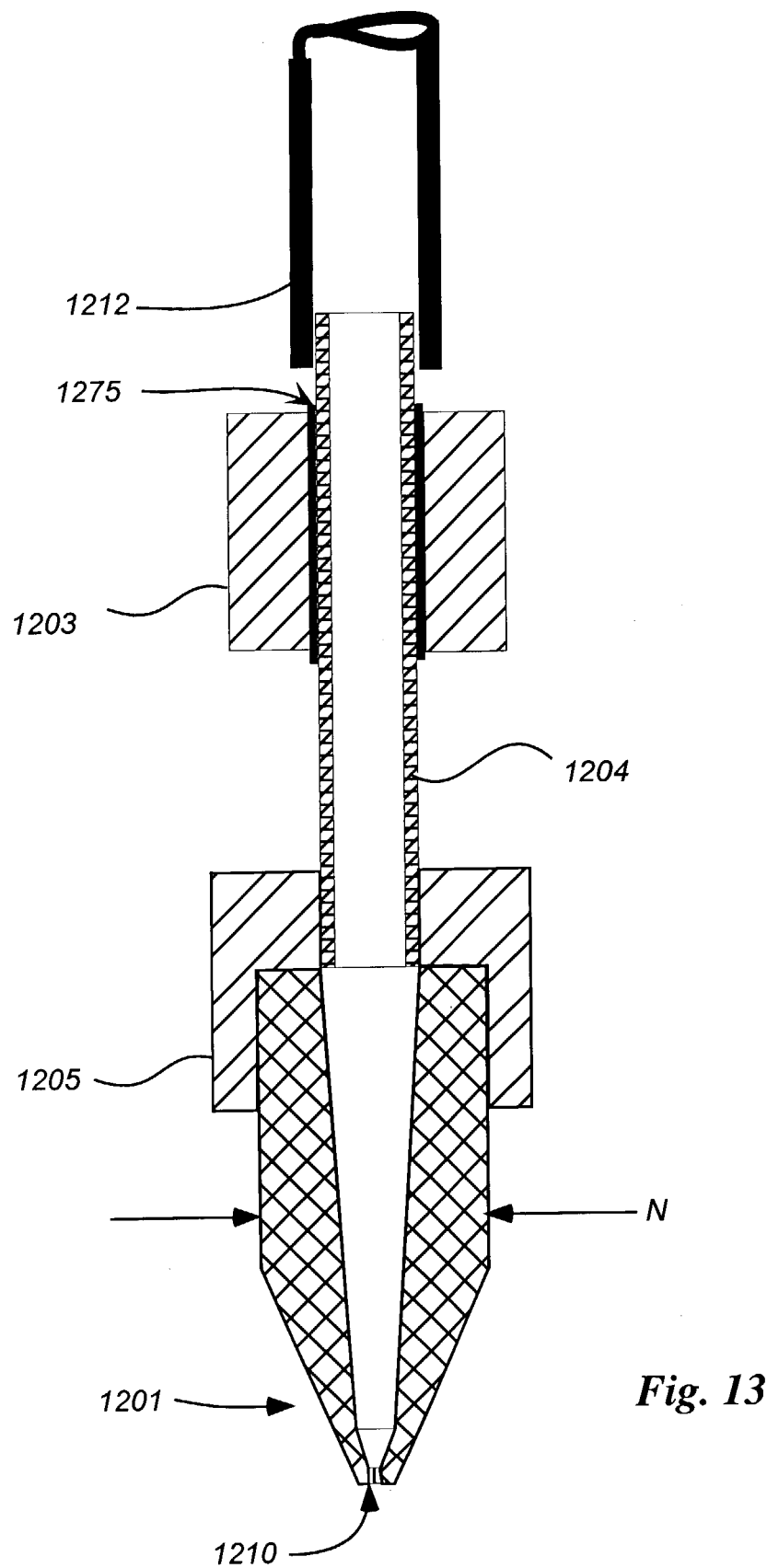
FIG. 13 is a schematic cross-section rendition of a positive pressure nozzle for use with printing components shown in FIG. 12.

One successful implementation of the positive pressure drop-on-demand printhead is as shown in FIG. 13. The printhead consists of a stainless steel tube 1204 surrounded over a portion of its length by a cylindrical piezoelectric ceramic 1203. An alumina nozzle 1201 attaches to the stainless steel tube by means of a tight-fitting Delrin coupling 1205. Flexible binder supply tubing 1212 is fixed to the upstream end of the stainless steel tube 1212.

An annular circular cylindrical piezoelectric ceramic 1203 is the printhead actuator. When a voltage is applied across its electrodes, the piezo contracts or expands, depending on the polarity of the applied voltage. In particular, the inside diameter of the piezo grows or shrinks. Since the piezo is tightly coupled (soldered) to the stainless steel tube 1204, which holds the binder fluid, every contraction or expansion of the piezo pushes or pulls on the stainless steel tube, which in turn causes a pressure wave in the fluid.

The geometry of the cylindrical piezo determines how effective it will be in transferring power to the binder fluid. A typical piezo is an annular circular cylinder a few times longer than its outside diameter. For a given inside diameter, the radial displacement of the inside piezo surface decreases with increasing outside diameter. Thus, relatively thin-walled piezo devices affect greater volume change in the printhead. Both the radial displacement and the axial displacement are proportional to the voltage applied across the piezo electrodes.

A typical implementation uses piezo elements having 0.030 inch (762 µm) inside diameter (ID), and 0.050 (1270 µm) inch outside diameter (OD).

In addition, the volume change in the printhead will be greater for longer piezo devices. However, the piezo should not be so long that the time it takes a pressure wave to propagate the length of the piezo is longer than the time scale of drop ejection. An eight millimeter piezo length corresponds to a wave propagation time in water of approximately five microseconds, which is slightly less than typical drop ejection time.

Piezo materials range dramatically in their properties. PZT5H piezo is relatively high sensitivity piezoelectric ceramic. It has an extremely high piezoelectric constant, which means it generates a high amount of strain for a given electric field.

Both the inside and outside electrodes of the piezo cylinder are electroless nickel. This material allows easy soldering. Neither the electrodes nor the ceramic itself need be compatible with binder solvents, as the binder fluid is entirely contained inside the stainless steel tube.

This type of piezo can be poled in air at 425 volts for 270 seconds. Usually, the inside electrode is positive. To avoid excessive stress on the piezo during poling, the piezo should not be poled while installed on the stainless steel tube because there is a volume change during the poling process. Instead, it should be poled before installation, free of external stress.

PZT5H has a very low Curie temperature of 195 degrees Celsius, so care should be taken to keep the piezo temperature low after it has been poled. If the piezo temperature rises too much during soldering or in operation, it will be partially of completely de-poled. Similarly, care should be taken not to exceed approximately 250 volts (peak-to-peak) for the typical ID and OD dimensions mentioned above across the piezo electrodes, to avoid de-poling. Thus, a low temperature solder should preferably be used (see below).

The printhead body itself is made of a thin wall stainless steel tube. The thin wall allows the piezo to more easily expand and contract the tube. One end of the stainless steel printhead body attaches to the binder supply tube, and the other end accepts the nozzle containing the orifice.

As mentioned above, a typical printhead implementation uses a piezo with a 0.030 inch (760 µm) inside diameter. The outside diameter of the stainless steel tube should match well with the ID of the piezo, while leaving a very slight gap for the solder that will later ensure a good connection. The wall should also be thin, so as to follow, as nearly as possible, the compression on the piezo when it is energized.

A wall thickness of between approximately 0.001 in (25 µm) and approximately 0.003 in (75 µm) for a stainless steel tube is satisfactory with less than approximately 0.002 in. (51 µm) being preferred. A larger wall thickness results in significantly reduced droplet ejection velocity. To obtain a wall that is consistently thinner than 0.002 in (51 µm), a stainless steel hypodermic needle having an acceptable inner diameter (ID) is chosen, (e.g., 0.026 in (660 µm)) and centerless ground to reduce the outside diameter (OD) and achieve the desired wall thickness. The size and tolerance specified on the OD is 0.0295 in (749 µm) max, 0.0290 in (737 µm) min. Such a thin walled tube is rigid and strong enough to support an interference fit connection of the coupling adapter 1205 and the fluid supply tube 1212.

Suitable tubular steel stock is available as needle stock from several vendors, including Vita Needle Company (Needham, Mass.). The tubing is fully hard 304 stainless steel, TIG welded and drawn.

Rather than being of constant inner and outer diameters, the steel body can have a thicker wall either upstream or down-stream of the piezo location.

For attaching the piezo to the printhead body, a non-standard solder 1275 (FIG. 14) is necessary, for two reasons. First, to avoid pre-stressing the piezo, the solder must have close to zero shrinkage open solidification. Second, it must have a very low melting point so as to stay well below the piezo Curie temperature (195 degrees Celsius).

A solder available from the Indium Corporation of America (Utica, N.Y.), number 136, is, 49 percent bismuth, 21 percent indium, 18 percent lead, and 12 percent tin (all by weight). It has close to zero dimension change upon solidification and a very low melting point of 58 degrees Celsius. It is at or very near to a eutectic composition.

Figure 1B:
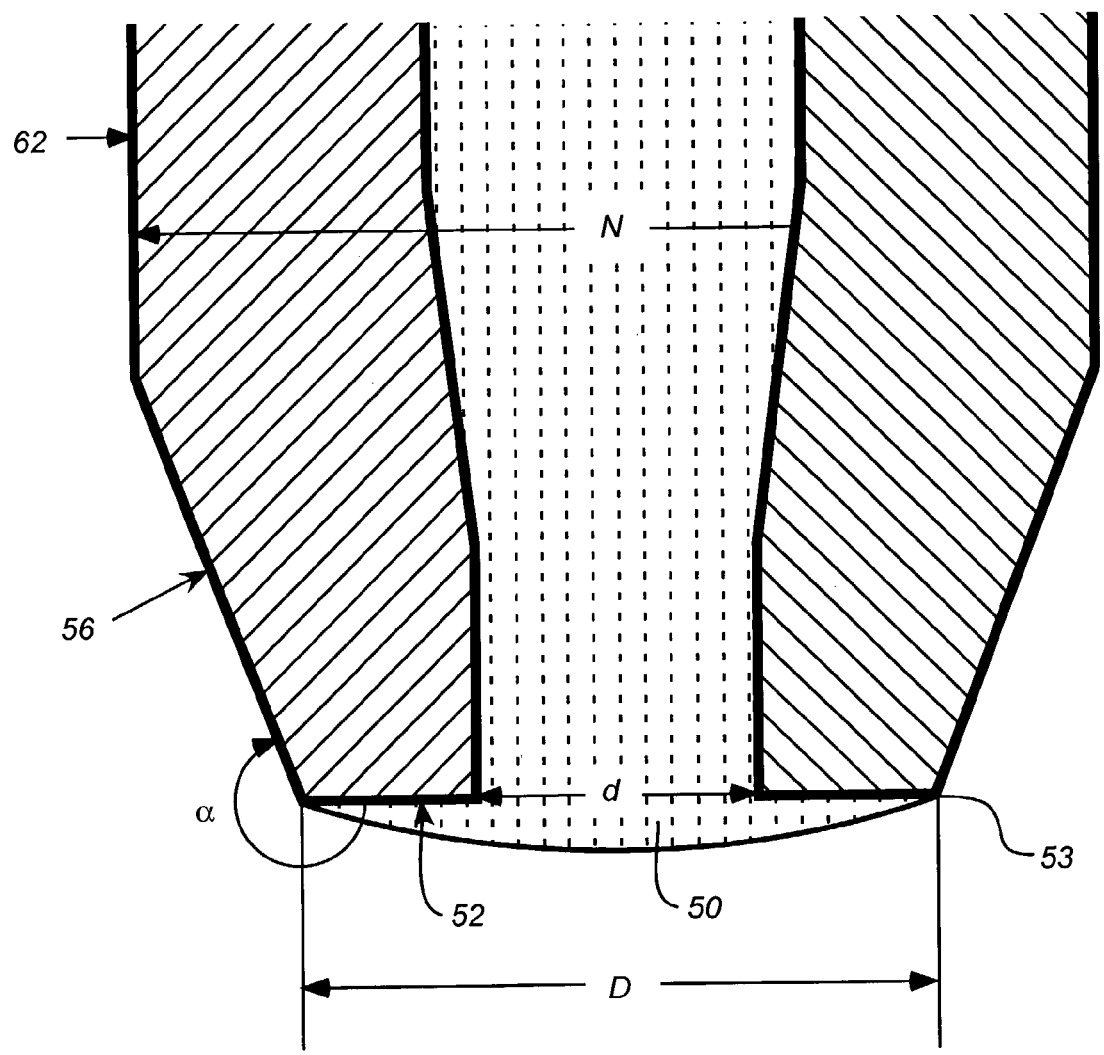
FIG. 1B is a schematic cross-sectional view of a positive pressure nozzle having a 250° outer edge angle with a fluid cap in place.
Figure 8:
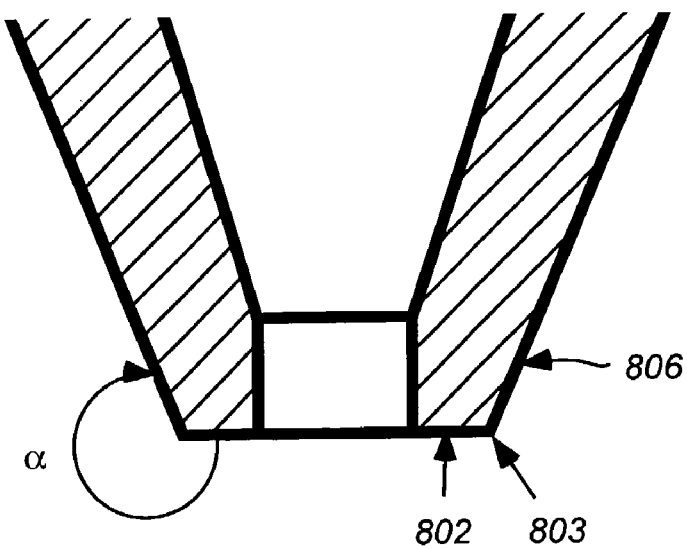
FIG. 8 is a schematic cross-sectional view of a positive pressure nozzle having a approximately 250° outer edge angle, such as shown in FIG. 1B, without a fluid cap.

The nozzle containing the orifice must be connected to the printhead body. A representative nozzle 1201, shown in FIG. 13, is a 0.375 inch (9.5 mm) long (from the orifice 1210 to the junction with the tube 1204) alumina cone-type, with 90 micrometer (0.0035 in) orifice land outer edge diameter D and 40 micrometer (0.0016 in) orifice 1210 diameter d. The main body of the nozzle has outside diameter N of 0.0625 inches (1.58 mm). The angle $\alpha$ between the land 52, which is substantially flat, and the circumferential surface 56 is approximately 255°. Such a nozzle is available from Gaiser Tool Co., mentioned above as a custom order. (FIGS. 1B and 8 show a nozzle with an angle $\alpha$ of approximately 250°.)

To couple the alumina nozzle to the stainless steel printhead body, a sleeve is used. The nozzle has an interference fit with the sleeve, and the Delrin sleeve is sized for a press fit over the end of the stainless steel tube. A suitable material for such a sleeve is Delrin, an acetal resin as manufactured by DuPont de Nemours & Company.

Delrin is dimensionally stable, has high solvent resistance, and provides a good press fit for repeatable nozzle installation. The coupling is designed to minimize small spaces where air bubbles could be trapped. It also avoids large internal diameter changes, to minimize excess fluid reflections in the printhead.

As has been mentioned above, rather than piezoelectric actuators, other types of actuators can be used. For instance, a heating element could be used in approximately the same location as piezoelectric actuator 1203 is located, to heat the liquid to a point that it boils and ejects liquid from the nozzle as a result of the expansion of gas bubbles. It may be beneficial to locate such a heating actuator much closer to the orifice than is shown in FIG. 12 or 13 (neither of which are to scale.) For instance, an evaporative heating actuator can be placed within the fluid path, upstream of an adjacent the orifice. Alternatively, a magnetostrictive actuator may be used in some cases.

This section discusses additional system equipment for use with a positive pressure Drop-on-Demand printhead. Such a system provides the fluid to be printed, the positive pressure necessary for printing as well as high pressure purging, a suitable waveform for the piezo, and inspection apparatus useful for troubleshooting and fine-tuning printhead operation.

The fluid system must supply suitably prepared binder fluid to the printhead 1200. In the printhead described above, the upstream end of the stainless steel tube 1204 has a flexible polymeric tube 1212 as its supply line. The other (upstream) end of the flexible tube attaches to a binder fluid reservoir 1213, which is always mounted directly above the printhead, on the same vertical axis. As the printhead 1201 moves about relative to the target, so too does the reservoir 1213. This inline reservoir maintenance minimizes potentially destructive pressure pulses that would otherwise be caused by net fluid acceleration in the supply line 1212 during intended printhead movements, or any other machine movements or vibrations that result in printhead acceleration in the printing (horizontal X-Y) plane.

In a case where the printhead is stationary and the targent moves, the reservoir need not be located directly above the orifice.

The reservoir has one lower outlet 1224 for binder supply to the printhead, and three or four upper inlets. Each inlet has an associated valve so that only one is open at a time. One inlet 1216 is for binder fluid refill of the reservoir 1213. This inlet line 1216 has an integral filter (5 micrometer (0.0002 in) sintered stainless steel) which removes any last particles from the binder before it enters the reservoir and printhead. The other inlets are for pressure control. One is for a high-pressure air line 1217 used when purging binder at a high flow rate through the printhead, as during startup. One is a vent 1225 to atmosphere, which allows the high-pressure air left in the reservoir after purging to vent when opened, leaving the reservoir air at atmospheric pressure.

The binder fluid inlet 1216 can be fed with a syringe. The high-pressure air inlet 1217 should have a line attached and supplied with approximately 10 pounds-per-square-inch (70,000 Pa) air. Tight control of this high pressure source is not necessary. It only needs to be high enough to push a continuous stream of binder through the printhead with the nozzle in place.

It is, of course, necessary to control the pressure of the cap at the orifice. Thus, some sort of positive pressure controller is required. Typically, it is possible to run the printhead with pressure at the orifice equal to the pressure due to the height of the binder 1215 in the syringe 1213 above the orifice 1210. In this case, the reservoir vent can be left open. Fine control over the pressure at the orifice can be achieved by adjusting the level of binder in the syringe 1213 relative to the orifice 1210. Thus, the syringe, 1213 and the means for adjusting its fluid level relative to the orifice, constitute the positive pressure controller.

A fourth, optional, inlet allows application of a variable pressure air line 1220 to the reservoir 1213. This variable pressure source can be used as an alternative way to establish the steady state operating pressure in the reservoir 1213 during drop formation, rather than by adjusting the height of the fluid 1215 in the reservoir 1213. Therefore it allows another way to achieve fine control over the operating pressure at the orifice 1210, as explained below. In that case, the additional optional equipment is also part of the positive pressure controller.

If used, the variable pressure inlet 1220 would be coupled to a pressure source 1236 capable of supplying approximately −5 to +5 inches of water pressure (−1,458 Pa to +1,458 Pa) to the reservoir. (All of the equipment about to be described is optional, and is used only if the fourth inlet 1220 is used.)

Under certain arrangements, the pressure at the orifice 1210 due to the height of the binder fluid 1215 with density $\rho_{binder}$ in the reservoir 1213 is greater than the desired orifice pressure. Thus, the pressure supplied by the variable pressure source 1236 needs to be slightly negative, relative to atmosphere, to combine to the desired positive pressure value at the orifice. Since this variable pressure source determines only the pressure in the reservoir 1213 above the binder fluid 1215, it must be adjusted to also take into account the height of the binder fluid above the orifice 1210. One adjustable way to provide this variable pressure source is to use a manometer tube 1233 with a large reservoir 1236 as shown in FIG. 12. Fluid in the manometer tube 1233 has a density $\rho_{manometer}$. With this method, the pressure at the orifice $p_{orifice}$ is given by $$p_{orifice} = \rho_{binder} g h_{binder} - \rho_{manometer} g h_{manometer} \tag{11}$$

where, as shown in the figure, $h_{binder}$ is the height of the fluid in the reservoir 1213 above the orifice and $h_{manometer}$ is the height of the manometer fluid in the vessel 1236 above the upstream end of the fluid in the tube 1233. The lower part of the tube 1233 is flexible to permit erasing and lowering the fluid level. Adjusting the height of the open end of the flexible manometer tube 1233 is a way to fine-tune the pressure at the orifice 1210.

It is also possible to automate the pressure control so that manual adjustment of the manometer tube 1233 is not necessary. For example, a level sensor and a vacuum pump can be combined to maintain a specified pressure. Any other suitable automated or non-automated apparatus is also reasonable to be used as positive pressure controller.

Rather than having a reservoir that establishes pressure as described, a more complicated, continuous flow system, with active positive pressure control can be used, if appropriate.

Another element of the reservoir 1213 is a built-in heater 1209, which is external to the reservoir 1213 to avoid contamination of the binder fluid 1215. The heater keeps the temperature of the binder fluid 1215 in the reservoir 1213 a few degrees Celsius above the temperature of the binder fluid in the printhead 1200, and in particular, the actuator 1203 region of the printhead. Usually, the binder fluid in the printhead is at ambient temperature, so the heater only needs to heat the reservoir a few degrees Celsius above ambient. This heating prevents the formation of air bubbles in the printhead. With an array of printheads, there is the option of heating the reservoir directly, as shown here, or heating all of the reservoirs with the same heater by a reservoir mounting block.

Even a tiny air bubble, with volume on the order of that of an ejected drop, can absorb much of the pressure change resulting from piezo contraction. If the air bubble absorbs the pressure change, drop ejection will be prevented or severely limited. Therefore, the presence of air bubbles should be avoided during printhead operation. The following typical example is instructive. Without a heater, during printhead operation, an air bubble the size of a drop (approximately 35 pL) will absorb enough of the piezo energy to prevent drop formation. For a small temperature change from 20 to 22 degrees Celsius, absorption of air by water decreases from 0.0190 to 0.0183 cubic centimeters of air per cubic centimeter of water. The stainless steel body of the printhead 1200 contains about 0.0073 cubic centimeters of fluid. Thus, the resulting change in absorption from 138 nL to 133 nL of air in the binder fluid means an extra 5000 picoliters of air may evolve in the printhead. This is equivalent to approximately one hundred drop-size air bubbles.

The heater 1209 addresses the air bubble problem by slightly raising the temperature of the binder fluid 1215 in the reservoir 1213. For many liquids, air absorption decreases with increasing temperature. The equilibrium air concentration in the binder fluid 1215 in the reservoir 1213 is therefore lower than it would be at ambient temperature. As the fluid travels out of the reservoir 1213, through the supply tubing 1212, and into the printhead 1200, it cools a few degrees to ambient temperature. As it cools, it is able to absorb more air. If there are any remaining air bubbles in the fluid as it nears the orifice 1210, the fluid is able to absorb them. In any event, no more air bubbles should be released from the fluid into the printhead, even if ambient temperature varies over time by one or two degrees.

Figure 15:
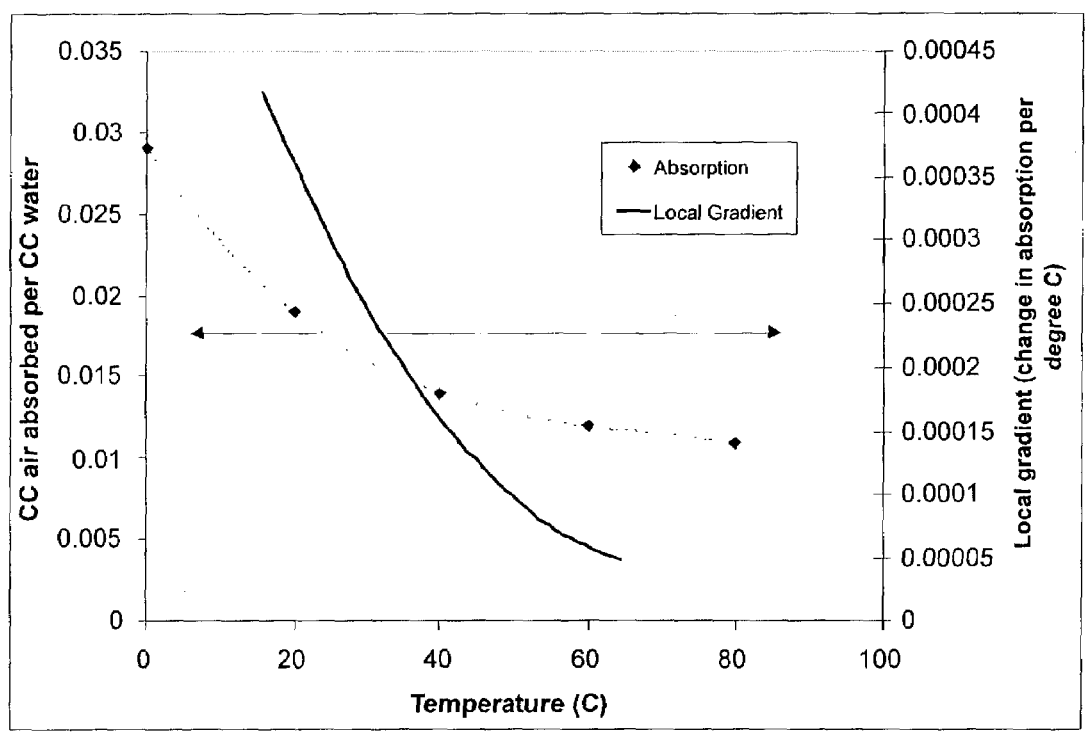
FIG. 15 is a graphical representation showing absorption of air in water, vs. temperature.

To demonstrate the magnitude of this effect, FIG. 15 shows air absorption for water v. temperature. The effect is strongest when the gradient is highest (curve is steepest). Thus, heating the binder fluid slightly above typical room temperature (~24° C.) allows a large change in absorption with a minimal change in temperature. When using this technique, it is beneficial to avoid heating the liquid so much that it evaporates from the main body of liquid, and then condenses back into liquid within the reservoir. For instance, heating between one and five degrees above ambient is adequate, and in some cases, as little as ½ a degree, or as much as 10 degrees may be possible.

Such a heater/degreaser can be used beneficially with most piezoelectric jet printers. The invention is not limited to positive presure printers, or Three-Dimensional printing. Rather than heating the supply reservoir above ambient, it is also possible to cool the supply tubing 1212 or the tube 1204 and actuator 1203 or all three to a few degrees below the temperature at which the supply reservoir is maintained. Or, both heating and cooling can be done. What must be done, is an adequate temperature differential must be established, with the fluid supply being warmer than the actuator region of the printhead.

The supply tubing 1212 (FIG. 22) that connects the reservoir to the printhead is another important element in the Drop-on-Demand system. Besides providing the binder fluid path, the tubing also affects wave travel in the system. Fluid pressure wave reflections from the interface between the printhead 1200 and the supply tubing 1212 are important on the individual drop formation time scale, because they return into the printhead 1200 very soon after the initial pressure wave is generated. Longer time scale reflections from the interface between the supply tubing and the reservoir 1213 are important because certain drop ejection frequencies allow the reflected wave from one drop to affect the next drop. Similarly, slower peristaltic waves traveling through the supply tubing can return to the printhead and affect subsequent drop formation.

As a demonstration of this effect, the inventors have noted a substantial difference in frequency response between a typical length of supply tubing (approximately 80 millimeters) and an extremely long length of supply tubing (2 meters). A dramatic drop frequency dependence of velocity for the typical length supply tubing shows the importance of these reflected waves. The frequency dependence almost entirely disappears when using the long supply tube, which eventually damps waves before they reflect back to the printhead.

The following procedure outlines a typical startup sequence for a positive pressure Drop-on-Demand printhead. First, the binder fluid should be de-gassed under partial vacuum to remove as much air as possible. The controlled reservoir heater 1209 can be switched on throughout operation. After loading the fluid into the reservoir 1213 through the binder supply inlet 1216, all other inlets should be closed and the high-pressure purge line 1217 opened. Optical (or another appropriate) verification can be made that there is a straight, continuous stream of binder fluid emerging from the nozzle 1210. Application of the drop-ejecting waveform to the piezo should break up the continuous stream into drops within about ten drop diameters of the orifice exit. A useful inspection tool is a light emitting diode timed to give a short strobe pulse at a variable delay after the beginning of the piezo waveform. In combination with a high magnification lens, camera and monitor, the strobe pulses effectively "freeze" the drop breakoff for inspection.

Initial purging may show the drop breakoff improving over tens of seconds to a few minutes. This improvement occurs as air bubbles are entrained, and/or dissolved and finally carried out of the printhead in the rapid fluid purging activity. When a stable breakoff is obtained, the high-pressure purge line 1217 can be closed, and the vent line opened 1225. This action releases the remaining high-pressure air from the top of the reservoir. The vent can then typically be left open. The steady state pressure can be established by raising or lowering the reservoir 1213 until satisfactory drop formation is achieved.

If, alternatively, the low pressure source is being used, the vent is closed and the low pressure source line 1220 is opened. This line then determines the steady state pressure at the orifice. Upon application of the variable pressure source (e.g., the piezo), drops should begin ejecting from the orifice at the frequency set by the electronics.

The sequence of digital images shown in FIG. 17A-17T shows a full droplet ejection operation cycle. The sequence was obtained using a camera with a high-magnification lens by incrementing the delay pulse by four microseconds between figures. FIG. 17A shows the initial steady state with a slightly outwardly bulging meniscus 1712. FIG. 17B shows complete retreat of the meniscus 1712 corresponding to the expansion pulse. FIG. 17C shows the front end of a drop 1713 column emerging from the orifice. Drop breakoff 1715 is shown nine frames later in FIG. 17L. The remaining meniscus recoils, and effective constraint is shown in FIG. 17R of the recoiled meniscus 1712 at the outer land edge 1703. (The sequence shown in FIGS. 17A–17T does not show droplet hold time, other than the very end of the hold time at 17A, and the beginning of the hold time at 17T.)

One way to eject continuous drops at a set frequency is to load a general purpose arbitrary waveform generator with the desired drop ejection waveform (as discussed above), and trigger the arbitrary waveform generator with a pulse generator at the intended drop ejection frequency. This trigger can also be used to produce the inspection strobe, using a variable delay circuit.

Once drops are ejecting from the orifice 1210, the level of positive pressure can be adjusted by changing the variable pressure source level (as, for example, by changing the height of the liquid level in the source 1213). Good operating pressure at the orifice for printing liquids having surface tensions even as widely different as between water and isopropyl alcohol is usually between slightly greater than 0 and 13 inches of water (3,100 Pa). Direct observation of drop quality (stability, satellite formation, velocity) helps in adjusting the pressure precisely. For instance, for water and a 90 μm land D, the overpressure that results in a hemisphere cap is 3,100 pascals or approximately 12.2 inches of water. For alcohol, with the same land, the overpressure that would result in a hemisphere cap is 960 Pa (3.8 inches of water). One would more typically operate at about half of this pressure (i.e. about 500 Pa) to produce a thinner fluid cap so that the drop can punch through and to be far away from the failure conditions.

Drop velocity can be measured by various means, including observing drop position at two different strobe delay values. Drop size can be calculated by measuring flow rate at a given drop ejection frequency f then calculating drop diameter, $d_{drop}$.

During times that the printhead is parked, it is beneficial to eject a droplet at a relatively low frequency, to help insure that the orifice and land remain wetted, and that evaporation not change characteristics of the liquid. A frequency of 20 Hz has been used successfully for volatile and polymer loaded inks. Certainly, lower and higher frequencies can be chosen based on the volatility and polymer loading of the ink.

Figure 18:
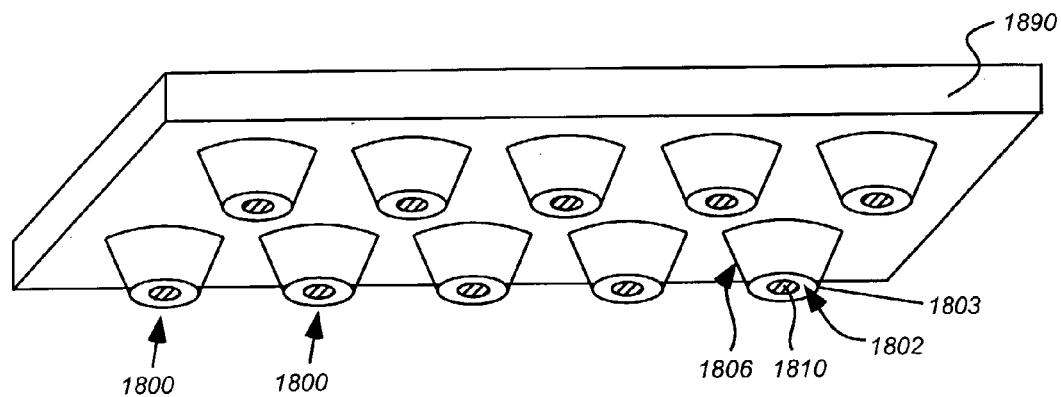
FIG. 18 shows, schematically, a printhead with an array of nozzles having an outer edge angle of less than 270°.

The foregoing discussion focuses on a single nozzle of a printhead. Many embodiments of apparatus have only a single nozzle, and a single orifice. However, it is also common for a printhead to have an array of a plurality of nozzles, each with its own orifice. Such a printhead is shown schematically with reference to FIG. 18. The printhead has a fixture 1890, upon which are housed an array (in this case ten) individual nozzles 1800, each having an orifice 1810, a surrounding land 1802, and a surrounding circumferential surface 1806 having an edge 1803 between the land and the circumferential surface. Such an array of nozzles can be controlled according to known techniques, as have been described in the various Three Dimensional Printing patents identified herein, and in conventional planar ink-jet printing or pharmaceutical delivery devices (for instance using a microtitre tray). Typically, each nozzle has associated therewith a droplet energizing element, such as a piezoelectric crystal, a small heater to boil, etc. In fact, the evaporative heater actuator is a good candidate to be used with such plural printheads, because they can be formed using masking and etching techniques, as can the nozzles. Thus, the nozzle and the evaporative heater can be formed using the same processing techniques and steps. The positive pressure can be established at each orifice individually, in the manner illustrated above, with a fluid reservoir for each orifice. Or a single positive pressurizer can be coupled to all of the orifices in parallel.

Each individual nozzle can be fabricated unitarily as discussed above, and then secured in the fixture with suitable fittings. Or, alternatively, the nozzles can be fabricated by other techniques, such as masking and etching. Etching can be used to remove material surrounding the region that will be come the land. With some etching techniques, as shown schematically in FIG. 19, very sharp edges 1903 can be established, even having under-cuts (angles greater than 270°). Typically, with a dry etchant, a circumferential surface 2006 that is near to perpendicular to the land surface can be achieved. With liquid etchants, an undercut, can be achieved resulting in a circumferential surface 1906 that is inclined relative to the land surface, inwardly, toward the fixture 2090.

Such multiple nozzle arrays may beneficially be used with each nozzle tracing out the definition of a single part. This way, if one nozzle fails, only a single part is lost. Of course, it is also possible to arrange the control so that more than one nozzle contributes to a single part. This potentially increases the risk of part damage due to nozzle failure, but permits making a large part faster. Also, each nozzle that contributes to the same part must be carefully positioned in register with the other nozzles that contribute to that part.

Figure 16A:
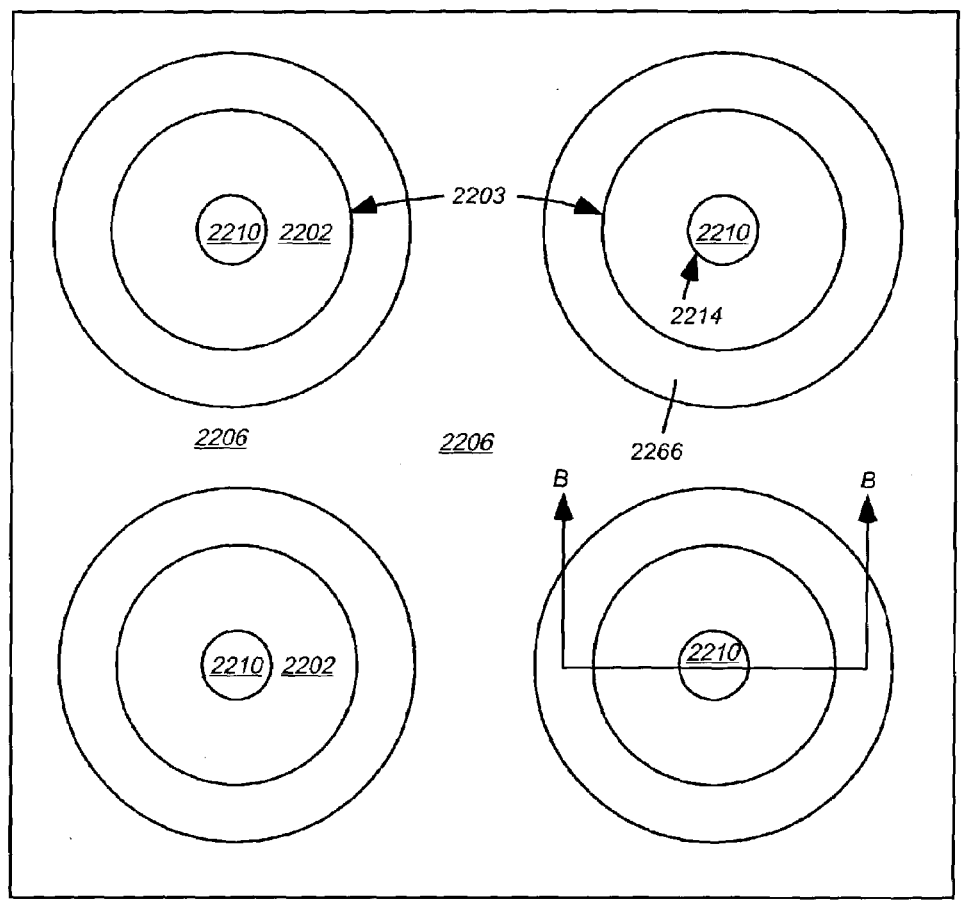
FIG. 16A shows schematically in plan view, a printhead having an array of nozzles such as are shown in FIG. 16B.
Figure 16B:
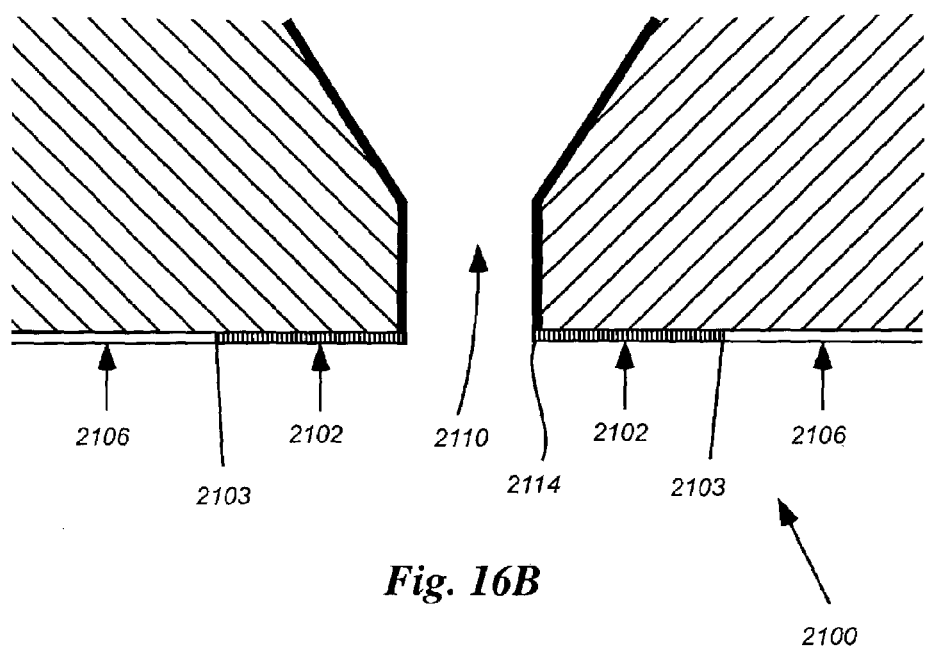
FIG. 16B shows, schematically in cross-section, a planar wetting nozzle, having an orifice, a surrounding region to be wetted, and a surrounding region not to be wetted.

The foregoing has discussed maintaining a well defined edge between the land and the circumferential surface by a relatively sharp edge beyond which the printing liquid will not wet, without some additional impetus. It is also theoretically possible, as shown in FIGS. 16A and 16B, to use a positive pressure nozzle 2100, with a wetted land 2102, that is circumscribed by a circumferential region 2106 that has a different, lower surface energy, which is much less prone to being wetted by the printing liquid than is the material of the land 2102. In such a case, there need not be any angle between the land 2102 and the circumferential region 2106. There is a sharp difference in surface energy. Typically, such a difference can be provided by coating the circumferential region 2106 with a coating that has a relatively lower surface energy. Any suitable known non-wetted coating that is otherwise consistent with the intended use can be used. When using such a device, care must be taken not to scratch or foul or otherwise damage the non-wetted coating, or else it may become wetted. Care must also be taken to avoid creating regions where the interface 2103 between the land and the circumferential surface is not flat. Otherwise, liquid could collect in the corners upon whichever surface is lower.

The circumferential region 2106 may be any shape. As shown in FIG. 16A, it may constitute an annular region 2266 that surrounds the wetted land 2202. The surrounding region 2206 may be whatever material is convenient.

The foregoing discussion addresses a nozzle having an annular land, that is circular, having a circular inner edge diameter d and a circular outer edge diameter D. The nozzle land must be annular, but it need not be circular annular. The annular land can by any shape, including but not limited to: rectangular, elliptical, circular (a special case of elliptical), any parallelogram, even irregular. There may be straight wall sections, as in a rectangular annulus, all smooth walls, or some combination of both. The inner and outer edges may be congruent, but they need not be. For instance, the inner edge can be circular, and the outer edge perimeter can be square.

If a non-circular annulus is used, it is convenient to adopt the conventions of an effective diameter and an effective radius to be used in the equations for analyzing the phenomena, such as Eqs. 2, 3, 7, 8 and 9. The effective outer diameter $D_e$ is the diameter of a circle having the same area A as is defined by the outer perimeter of the non-circular annular edge. In the general case $$D_e = 2\sqrt{\frac{A}{\pi}}. \tag{12}$$

For instance, if a rectangular annulus with outer edge sides of lengths z and y is used, an effective diameter $D_e$ is established by setting $$A = x \times y = \frac{\pi D_e^2}{4},$$

which results in $$D_e = 2\sqrt{\frac{zy}{\pi}}. \tag{13}$$

The convention of an effective radius is analogous, being one-half an effective diameter. Thus, as used herein, and in the claims, any mention of a diameter, or of a radius may be applied with generality to a non-circular annulus, by using the effective diameter or radius, unless explicitly stated to the contrary. Also, for a circular annulus, the effective diameter is equal to the actual, natural diameter. The surface that bounds the outer edge has been referred to herein as a circumferential surface. That term is also applicable to such a surface that bounds a non-circular annular land, and its use herein and the claims should be taken to include non-circular bounding surfaces. In some instances, particularly in the claims, the bounding surface is called a perimetrically bounding surface.

The foregoing discussion has used as an example Three Dimensional Printing, where the liquid printed is a binder liquid. The inventions discussed herein are also useful for all types of Drop-on-Demand liquid ejection techniques, such as normal ink-jet printing used with printers for computers, cash registers, diagnostic equipment, etc. Virtually any drop-on-demand application which, in the past, has been accomplished using negative pressure, or a meniscus that does not wet a nozzle land, can now be used with the techniques described herein. Similarly, rather than using non-wetting coatings on the nozzle land, the techniques and apparatus disclosed herein can be used, with positive pressure and a wetted land.

There are other applications for droplet ejection that might not be conventionally considered to be printing, because no graphical or pictorial pattern is intended, but which also can take advantage of the principles discussed herein. These uses are considered to be included as inventions hereof. For instance, it was at the time of this application, becoming known to dispense very small amounts of pharmaceutical materials onto various types of targets. The targets include: trays of arrays of tiny wells (some of which are known as microtitre trays; papers with different reagents coated thereon; consumables, such as tablets, pills; epidermal patches, with multiple target regions thereon, etc. Other types of targets include scaffolds upon which artificial skin, bone, cartilage components and other biological tissues and structures will be made.

For many such targets, the material to be printed is based on an organic solvent, and thus has a very low surface tension, and thus can very beneficially be used with the positive pressure nozzle discussed herein.

Inventions disclosed and described herein include methods. For initial discussion purposes, it is helpful to keep in mind an application for Three Dimensional printing, ink jet printing of ink and dispensing pharmaceutical materials. However, the method inventions described herein are not limited to such an application, and any other application in which a positive pressure nozzle for ejecting very small droplets of liquid can be used, is contemplated as an intended use for such articles.

Similarly, the inventors consider their invention to include Three Dimensional printers, inkjet printers, pharmaceutical material dispensers, and their components, and larger assemblies that include them. Also similarly, the apparatus inventions are not limited to such devices, and any other device with a positive pressure nozzle that ejects very small droplets of liquids, for whatever case, is contemplated as an apparatus of the invention.

Partial Summary

Thus, this document discloses many related inventions.

One invention disclosed herein is a method for printing drops of liquid. The method comprises the steps of: providing a quantity of liquid to be printed and a nozzle. The nozzle defines an orifice that is aligned along an axis, and has an annular land surrounding the orifice. The land is bounded perimetrically by an outer edge. The method further includes the steps of coupling the quantity of liquid hydraulically to the orifice, filling the orifice with some of the quantity of liquid, and establishing within the liquid in the orifice, a steady state pressure that is greater than atmospheric by an overpressure, great enough to cause a cap of liquid to cover the annular land and the orifice. The method also includes the steps of selectively causing a single drop of liquid to detach from the cap of liquid and to be ejected from the orifice and allowing pressure at the orifice to return to the steady state pressure, such that a cap of liquid covers the annular land and the orifice. The liquid may be retained in a reservoir, and coupled to the orifice through a conduit.

The land may be a circular annulus, having an outer radius of $R_{land}$ It may also be of a material that is wetted by the liquid to be printed.

The step of establishing a steady state pressure may comprise establishing a pressure that is: not so great as to cause the liquid to wet beyond the outer edge; and not so great as to cause the liquid to form a cap having an outer surface that is larger than a hemisphere having a radius equal to $R_{land}$.

The step of providing a nozzle may comprise providing a nozzle that further comprises a perimetrical surface that perimetrically bounds the outer edge, the perimetrical surface being inclined relative to the land by an edge angle $\alpha > 180°$ and more particularly greater than about $210°$ and less than about $315°$, and even more particularly greater than about $225°$ and less than about $270°$. The step of providing a liquid may comprise providing an organic solvent, such as an alcohol based or chloroform based material.

The step of providing liquid includes providing liquid having a wetting angle with respect to the material of the orifice land that is less than about $50°$ even as low as the theoretical limit of zero degrees. The liquid may also be a vehicle that is loaded with a material selected from the group consisting of: dissolved polymer; polymer particles; and ceramic particles.

The step of providing an orifice may include providing an orifice with a land material of glass, ceramic, or alumina.

Other aspects of inventions disclosed herein relate to creating an overpressure. The liquid cap has a surface that defines at its perimeter, a contact angle $\gamma$ with the land, and the liquid on the orifice land material has a wetting angle, $\omega$. The step of establishing a steady state pressure may comprise establishing an over pressure that maintains the cap of a configuration that maintains the angle $\gamma$ to be less than $\omega+\alpha-180°$.

A related aspect of an invention is that for a liquid having a surface tension $\sigma$ and a wetting angle $\omega$ with respect to the surface material, the step of providing an overpressure comprises providing a pressure that is greater than $$P_{\min} = \frac{2\sigma}{R_{land}} \sin(\omega).$$

Another related aspect of an invention is that the step of providing an overpressure comprises providing a pressure that is less than $$P_{maxhemi} = \frac{2\sigma}{R_{land}}.$$

Another related aspect of an invention is that the step of providing an overpressure comprises providing a pressure that is less than $$P_{maxwet} = \frac{2\sigma}{R_{land}} \sin(\omega + \alpha - 180).$$

Typically, the step of providing an overpressure is to provide a pressure that is less than both $$P_{maxwet} = \frac{2\sigma}{R_{land}} \sin(\omega + \alpha - 180) \text{ and } P_{maxhemi} = \frac{2\sigma}{R_{land}}.$$

Yet another aspect of an invention is to establish an overpressure by providing a reservoir of the liquid, hydraulically coupled to and gravitationally above the orifice, and maintaining a surface of the reservoir of the liquid a controlled distance above the orifice. This can be done by measuring the surface location, and replenishing liquid when necessary to maintain the surface within an established tolerance from the controlled distance. In a related aspect, it is further helpful to coordinate movement of the reservoir to coincide with any motion of the orifice, so that the middle of the reservoir always remains substantially directly above the orifice.

The step of selectively ejecting a droplet of liquid can be accomplished by providing a piezoelectric actuator, acoustically coupled to the liquid in the orifice through a conduit and by energizing the actuator to change its shape and the shape of the conduit sufficiently to initiate in the liquid a pressure wave that travels to the orifice to cause a single droplet of liquid to be ejected from the orifice. If a piezoelectric actuator is used, a related beneficial method is to provide the quantity of liquid at a temperature of between about ½ and about 10 degrees C. more than a temperature at which any liquid at the piezoelectric actuator is maintained. This can be done by heating the quantity of liquid, or by cooling liquid at the actuator. In a similar way, an invention can also be practiced by providing the quantity of liquid at a temperature greater than that of any liquid at the actuator by an amount that is sufficient to decrease the capacity of the warmer liquid to absorb atmospheric gas, relative to the absorption capacity of any liquid at the actuator by an amount sufficient to substantially eliminate any gas bubbles in any liquid at the actuator.

The step of selectively ejecting a droplet of liquid can be accomplished providing an evaporative heater, thermally coupled to the liquid and energizing the heater to heat sufficiently to cause a single droplet of liquid to be ejected from the orifice.

Another related invention is to periodically eject a droplet of liquid at a relatively low frequency, as compared to a printing frequency, during times the nozzle is parked.

In general, a steady state pressure is established that is great enough to cause a cap of liquid to cover the land and orifice when the nozzle is quiescent, and, optionally, when it is holding.

In addition to method inventions, the present disclosure also outlines apparatus inventions.

A preferred embodiment of an apparatus of the invention is an apparatus for printing a liquid, the apparatus comprising a printhead nozzle comprising an annular body that defines an orifice aligned with an axis. The nozzle further comprises an annular orifice land having an outer effective diameter $D=2R_{land}$, comprising a land material, and a perimetrical surface that meets the land at a perimetrical outer edge. A liquid delivery unit is hydraulically coupled to the orifice, as is a pressure controller. The controller is adapted to establish a steady state, positive overpressure, relative to surrounding atmosphere, to any liquid within the orifice, sufficient to cause the liquid to stably cover the orifice and the land. An excitation unit is coupled to the orifice and operative to selectively eject a single drop of any liquid within the nozzle from the orifice.

It is beneficial if the pressure controller is adapted to maintain any liquid in the orifice substantially fully covering the annular land and the orifice when the nozzle is quiescent, and, in some cases, at all times when it is static, which would also include holding during printing.

The land may be a substantially flat surface, a convex outward facing surface, or any shaped surface.

The excitation unit may comprise a piezoelectric element that is acoustically coupled to the orifice, or a heating element that is thermally coupled to the orifice, or any other suitable actuator.

In one embodiment, the pressure controller is a reservoir and a fixture that maintains liquid within the reservoir gravitationally above the orifice.

Another preferred embodiment of an apparatus, having a land with an outer effective radius $R_{land}$, for use with a liquid having surface tension $\sigma$, and a wetting angle $\omega$ with respect to the land material, has a pressure controller that is adapted to pressurize any liquid at the orifice to at least $$P_{min} = \frac{2\sigma}{R_{land}}\sin(\omega).$$

Further, it is beneficial that the pressurizing unit be adapted to pressurize the liquid to less than $$P_{maxhemi} = \frac{2\sigma}{R_{land}}.$$

According to an embodiment of an apparatus invention, a printer has a plurality of substantially identical nozzles, all hydraulically coupled to a liquid delivery unit and the pressure controller in substantially the same manner. Or, each nozzle can have an individual excitation unit. It is particularly beneficial for such an apparatus to use an evaporative heater as an excitation device for each individual nozzle. A fixture may maintain all of the plurality of nozzles together in an array.

In a typical embodiment, the perimetrical surface meets the orifice land at an outer edge. The outer edge is defined by a radius q, and is shaped and located at an effective radius $R_{land}$ from the axis, such that $q/R_{land}$ is much less than ten, preferably much less than 100. The edge is further defined by the outer perimetrical surface that meets the orifice land at an angle $\alpha$ of between about 225 degrees and about 315 degrees.

A useful embodiment has the pressurizing unit being operative to pressurize the liquid to less than $$P_{maxwet} = \frac{2\sigma}{R_{land}}\sin(\omega + \alpha - 180),$$

and also less than $$P_{maxhemi} = \frac{2\sigma}{R_{land}},$$

mentioned above.

Still another preferred embodiment of an apparatus invention has the edge being defined by a surface that meets the orifice land at an angle $\alpha$ of between about 255 degrees and about 270 degrees. A useful size for the orifice is having an effective diameter d of less than about one hundred microns, preferably less than about sixty microns. A useful size for the orifice land outer edge is having an effective diameter of less than about three hundred microns, preferably of less than about one hundred microns.

Embodiments of an apparatus of the invention can have a land that is alumina, glass, ceramic and other materials.

Yet another embodiment of an apparatus invention is a printing apparatus with a means for establishing a temperature differential between any liquid in the liquid delivery unit and any liquid at the piezoelectric element, such that any liquid in the liquid delivery unit is warmer. The means may include an upstream heater, a downstream cooler, or both.

An extremely practical apparatus embodiment has a body comprising a thin-walled metal tube, for instance stainless steel, having an annular wall thickness of between approximately 25 microns (0.001 in) and approximately 75 microns (0.003 in). With such a nozzle, the actuator can be a piezoelectric actuator acoustically coupled to the tube, for instance being concentric around it, coupled to it with a low temperature solder, having approximately zero shrinkage upon solidification, such as a solder comprising Bismuth (49%), indium (21%), lead (18%) and tin (12%) all, by weight, which is a eutectic composition.

Yet another apparatus is an apparatus for printing a liquid, comprising a printhead nozzle comprising a body that defines an orifice and a liquid delivery unit, hydraulically coupled to the orifice. A piezoelectric excitation unit is arranged to be acoustically coupled to any liquid in the orifice nozzle and is operative to selectively eject a single drop of liquid from the orifice. There is also means for establishing a temperature differential between any liquid in the liquid delivery unit and any liquid at the excitation unit, such that any liquid at the liquid excitation unit is cooler.

Still another invention is a process for making a component comprising the steps of depositing a layer of a powder material in a confined region and applying to one or more selected regions of the layer of powder material a liquid containing a further material which will cause the layer of powder material to become bonded at the one or more selected regions. The applying step is conducted by drop-on-demand jet printing single drops of the liquid through a nozzle defining an orifice that is aligned along an axis, and having an annular land surrounding the orifice. The land has an outer effective radius $R_{land}$ and is bounded perimetrically by an outer edge. The orifice and land are maintained covered by a cap of liquid when the nozzle is quiescent. The steps of depositing material, applying a liquid and maintaining the land and orifice covered are repeated a selected number of times, to produce a selected number of successive layers, the further material causing the successive layers to become bonded to each other. Unbonded powder material is removed, which is not at the one or more selected regions, to provide the component. With this method, as with the others, the orifice land and orifice may be maintained covered while the nozzle is holding. The liquid may comprise a material selected from the group consisting of: organic solvents, water, isopropyl alcohol, ethyl alcohol and chloroform.

Still another invention is an apparatus for making a three dimensional part comprising: a powder dispenser, that provides successive adjacent layers of powder and a drop-on-demand liquid jet dispenser that dispenses single drops of a liquid that contains a further material that will cause grains of the powder to become bound to adjacent grains within a layer, and between adjacent layers. The dispenser comprises a nozzle, comprising an annular body that defines an orifice that is aligned with an axis, and has a perimetrical annular land, bounded by an outer orifice edge. A liquid delivery unit is hydraulically coupled to the orifice by a conduit. A pressure controller is coupled to the orifice and is operative to maintain, in any liquid in the orifice, a steady state positive pressure relative to surrounding atmosphere sufficient to maintain a cap of liquid that substantially completely covers the orifice and land. A positioner positions the nozzle at selected positions adjacent the layer of powder.

Many techniques and aspects of the inventions have been described herein. The person skilled in the art will understand that many of these techniques can be used with other disclosed techniques, even if they have not been specifically described in use together.

For instance, any of the following features can be used in combination or subcombination with any of the other method features: providing liquid in a nozzle with an orifice and a land, establishing within the liquid an overpressure that causes a cap of liquid to cover the land and the orifice, selectively causing a single drop of liquid to eject from the orifice, and allowing the pressure to return to a steady state with the cap of liquid covering the land; establishing a steady state overpressure using a reservoir, a manometer, or a continuous flow apparatus; establishing a temperature differential in a drop-on-demand printer, either by heating upstream components or cooling downstream components, or both, thereby minimizing the potential for the presence of gas bubbles at the orifice; maintaining an overpressure at above $$P_{min} = \frac{2\sigma}{R_{land}}\sin(\omega)$$

and below both of $$P_{maxwet} = \frac{2\sigma}{R_{land}}\sin(\omega + \alpha - 180) \text{ and } P_{maxhemi} = \frac{2\sigma}{R_{land}};$$

maintaining a liquid cap covering the orifice and the land at all times the printer is quiescent, and, possibly, also when holding during printing; actuating an array of nozzles together; providing the overpressure to an array of nozzles together; coupling a piezoelectric actuator to a very small diameter metal nozzle tube using a low melting temperature solder at a eutectic composition, as set forth herein; wetting a glass, alumina or ceramic nozzle and land with the printing liquid; ejecting a droplet of liquid periodically at a relatively low frequency when the nozzle is parked; printing liquid based on isopropyl or ethyl alcohol, water, chloroform, and other organic solvents; printing liquid that has a very small wetting angle with respect to the material of the orifice and its land; loading the printing liquid with polymer, either dissolved or particles, or ceramic particles, and printing the loaded liquid; depositing a layer of powder and printing liquid onto the layer as a binder to bind selected regions of the layer together along with regions of adjacent layers that are laid before and after the layer in question, particularly a Three Dimensional printing apparatus.

Further, any of the following features can be used in combination or in sub-combination with any of the other apparatus features: a land with an angled edge; an apparatus for establishing a temperature differential in a drop-on-demand printer, either an upstream heater or a downstream cooler, or both; a pressurizing unit; any sort of suitable actuator, including piezoelectric and evaporative heater; pressurizer adapted to maintain an overpressure at above $$P_{min} = \frac{2\sigma}{R_{land}}\sin(\omega)$$

and below both $$P_{maxwet} = \frac{2\sigma}{R_{land}}\sin(\omega + \alpha - 180) \text{ and } P_{maxhemi} = \frac{2\sigma}{R_{land}};$$

a pressurizer adapted to maintain a liquid cap covering the orifice and the land at all times the printer is quiescent, and, possibly, also when holding during printing; a fixture for maintaining an array of nozzles; each nozzle of such an array either having its own dedicated actuator and pressurizing unit, or sharing an actuator or a pressurizing unit, or both with at least one other nozzle; a nozzle having a land having an effective diameter D of less than about 200 microns and an orifice having an effective diameter d of less than about 100 microns; a piezoelectric actuator coupled to a very small diameter metal nozzle tube using a low melting temperature solder at a eutectic composition, as set forth herein; a glass, alumina or ceramic nozzle and land that is wetted by the liquid; additional equipment depositing a layer of powder onto which the liquid will be printed as a binder to bind selected regions of the layer together along with regions of adjacent layers that are laid before and after the layer in question, particularly a Three Dimensional printing apparatus.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any of such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

Documents of Possible Interest

Body, D. B., and Talke, F. E. "Experimental and Theoretical Study of Wave Propagation Phenomena in Drop-on-Demand Ink Jet Devices," IBM Journal of Research and Development, Volume 28, Number 3, 1984.

Morgan Matroc, Inc. "Guide to Modern Piezoelectric Ceramics," 1993.

Wallace, David B. "A Method of Characteristics Model of a Drop-on-Demand Ink-Jet Device Using an Integral Method Drop Formation Model," American Society of Mechanical Engineers # 89-WA/FE-4, 1989.

Three-Dimensional Printing

All of the following are incorporated fully herein by reference.

A processing technique that uses powders has become known as "three-dimensional printing" ("3D Printing") and is described in general in numerous patents, including: (MIT 4972) U.S. Pat. No. 5,204,055, entitled THREE-DIMENSIONAL PRINTING TECHNIQUES, by Sachs, Haggerty, Cima, and Williams; (MIT 4972D1) U.S. Pat. No. 5,340,656, entitled THREE-DIMENSIONAL PRINTING TECHNIQUES, by Sachs, Haggerty, Cima, and Williams; (MIT 5567) U.S. Pat. No. 5,387,380, entitled THREE-DIMENSIONAL PRINTING TECHNIQUES, by Cima, Sachs, Fan, Bredt, Michaels, Khanuja, Lauder, Lee, Brancazio, Curodeau, and Tuerck; (MIT 5997US) U.S. Pat. No. 5,490,882, entitled PROCESS FOR REMOVING LOOSE POWDER PARTICLES FROM INTERIOR PASSAGES OF A BODY, by Sachs, Cima, Bredt, and Khanuja; (MIT 6998) U.S. Pat. No. 5,660,621, entitled BINDER COMPOSITION FOR USE IN THREE-DIMENSIONAL PRINTING, by James Bredt; (MIT 7010US) U.S. Pat. No. 5,775,402, issued Jul. 7, 1998, entitled ENHANCEMENT OF THERMAL PROPERTIES OF TOOLING MADE BY SOLID FREE FORM FABRICATION TECHNIQUES, by Allen, Michaels, and Sachs; (MIT 6138FWC) U.S. Pat. No. 5,807,437, issued on Sep. 15, 1998, entitled HIGH SPEED, HIGH QUALITY THREE DIMENSIONAL PRINTING, by Sachs, Curodeau, Fan, Bredt, Cima, and Brancazio; (MIT 7634) U.S. Pat. No. 5,940,674, issued Aug. 17, 1999, entitled THREE DIMENSIONAL PRODUCT MANUFACTURE USING MASKS, by Sachs and Cima; (MIT 6924) U.S. Pat. No. 6,070,973, issued on Jun. 6, 2000, entitled NON-RESONANT AND DECOUPLED DROPLET GENERATOR, by Sachs and Serdy; (MIT 7642) U.S. Pat. No. 6,397,922, issued on Jun. 4, 2002, entitled MOLDS FOR CASTING WITH CUSTOMIZED INTERNAL STRUCTURE TO COLLAPSE UPON COOLING AND TO FACILITATE CONTROL OF HEAT TRANSFER, by Sachs, Bang and Cima; (MIT 6995) and U.S. Pat. No. 6,036,777, issued Mar. 14, 2000, entitled POWDER DISPENSING APPARATUS USING VIBRATION, by Sachs; (MIT 7780) U.S. Pat. No. 6,508,980 Bi, issued Jan. 21, 2003, entitled METAL AND CERAMIC CONTAINING PARTS PRODUCED FROM POWDER USING BINDERS DERIVED FROM SALT, by Sachs, Hadjiloucas, Allen and Yoo. All of the foregoing 3D Printing patents are incorporated herein fully by reference.

3D Printing is also disclosed and discussed in co-pending, co-assigned applications, including: (MIT 7751) U.S. patent application Ser. No. 09/445,670, entitled JETTING LAYERS OF POWDER AND THE FORMATION OF FINE POWDER BEDS THEREBY, by Sachs, Caradonna, Serdy, Grau, Cima, and Saxton, the U.S. National Phase of PCT application PCT/US98/12280, filed Jun. 12, 1998; (MIT 8873CP) U.S. patent application Ser. No. 09/863,073, filed May 21, 2001, entitled TECHNIQUES FOR INFILTRATION OF A POWDER METAL SKELETON BY A SIMILAR ALLOY WITH MELTING POINT DEPRESSED, by Lorenz, Sachs, and Allen; (MIT 8873) U.S. patent application Ser. No. 10/276,457, entitled INFILTRATION OF A NET SHAPE POWDER METAL SKELETON BY A SIMILAR ALLOY WITH MELTING POINT DEPRESSED TO CREATE A HOMOGENEOUS FINAL PART, by Sachs, Lorenz and Allen, the U.S. National Phase of PCT application PCT/US US01/16427, filed May 21, 2001. All of the foregoing 3D Printing patent applications are incorporated herein fully by reference.

The invention claimed is:

1. A method for printing drops of liquid, the method comprising the steps of:
   a. providing a quantity of liquid to be printed;
   b. providing a nozzle, the nozzle defining an orifice that is aligned along an axis, and having an annular land surrounding the orifice, the land being bounded perimetrically by an outer edge;
   c. coupling the quantity of liquid hydraulically to the orifice;
   d. filling the orifice with some of the quantity of liquid;

e. establishing within the liquid in the orifice, a steady state pressure that is greater than atmospheric by an overpressure, great enough to cause a cap of liquid to cover the annular land and the orifice;

f. selectively causing a single drop of liquid to detach from the cap of liquid and to be ejected from the orifice; and g. allowing pressure at the orifice to return to the steady state pressure, such that a cap of liquid covers the annular land and the orifice.

2. The method of claim 1, the land being a circular annulus, having an outer radius of $R_{land}$.

3. The method of claim 2, the step of establishing a steady state pressure comprising the step of establishing a pressure that is:

a. not so great as to cause the liquid to wet beyond the outer edge; and b. not so great as to cause the liquid to form a cap having an outer surface that is larger than a hemisphere having a radius equal to $R_{land}$.

4. The method of claim 2, the liquid having a surface tension σ and a wetting angle ω with respect to the surface material, the step of providing an overpressure comprising the step of providing a pressure that is greater than $$P_{min} = \frac{2\sigma}{R_{land}} \sin(\omega).$$

5. The method of claim 4, the step of providing an overpressure comprising the step of providing a pressure that is less than $$P_{maxhemi} = \frac{2\sigma}{R_{land}}.$$

6. The method of claim 1, the step of providing a quantity of liquid comprising providing a quantity of liquid in a reservoir, the step of hydraulically coupling the quantity of liquid comprising coupling the reservoir to the orifice through a conduit.

7. The method of claim 1, the step of providing a nozzle comprising providing a nozzle having a land comprising a material that is wetted by the liquid.

8. The method of claim 1, the step of providing a nozzle comprising providing a nozzle that further comprises a perimetrical surface that perimetrically bounds the outer edge, the perimetrical surface being inclined relative to the land by an edge angle α>180°.

9. The method of claim 8, the step of providing a nozzle comprising providing a nozzle with a perimetrical surface inclined relative to the land by an edge angle α of greater than about 210° and less than about 315°.

10. The method of claim 8, the step of providing a nozzle comprising providing a nozzle with a perimetrical surface inclined relative to the land by an edge angle α of greater than about 225° and less than about 270°.

11. The method of claim 8, the liquid cap having a surface that defines at its perimeter, a contact angle γ with the land, and the liquid on the orifice land material having a wetting angle, ω, the step of establishing a steady state pressure comprising the step of establishing an over pressure that maintains the cap of a configuration that maintains the angle γ to be less than ω+α−180°.

12. The method of claim 8, the liquid on the orifice land material having a wetting angle ω, the step of providing an overpressure comprising the steps of providing a pressure that is less than $$P_{maxwet} = \frac{2\sigma}{R_{land}} \sin(\omega + \alpha - 180).$$

13. The method of claim 1, the liquid having a wetting angle with respect to the material of the orifice land that is less than about 50°.

14. The method of claim 1, the liquid comprising an organic solvent.

15. The method of claim 1, the liquid comprising an alcohol based material.

16. The method of claim 15, the liquid comprising an ethyl alcohol based material.

17. The method of claim 15, the liquid comprising an isopropyl alcohol based material.

18. The method of claim 1, the liquid comprising a chloroform based material.

19. The method of claim 1, the land material comprising glass.

20. The method of claim 1, the land material comprising a ceramic.

21. The method of claim 1, the land comprising alumina.

22. The method of claim 1, the liquid comprising a liquid vehicle that is loaded with a material selected from the group consisting of: dissolved polymer; polymer particles; and ceramic particles.

23. The method of claim 1, the step of establishing an overpressure comprising the step of providing a reservoir of the liquid, hydraulically coupled to and gravitationally above the orifice, and maintaining a surface of the reservoir of the liquid a controlled distance above the orifice, to establish the overpressure.

24. The method of claim 23, further comprising the step of coordinating movement of the reservoir to coincide with any motion of the orifice, so that the middle of the reservoir always remains substantially directly above the orifice.

25. The method of claim 23, the step of maintaining the surface a controlled distance above the orifice comprising measuring the surface location, and replenishing liquid when necessary to maintain the surface within an established tolerance from the controlled distance.

26. The method of claim 1, further comprising the steps of:

a. providing a piezoelectric actuator, acoustically coupled to the liquid in the orifice through a conduit;

b. the step of selectively causing a single droplet of liquid to be ejected from the orifice comprising the step of energizing the actuator to change its shape and the shape of the conduit sufficiently to initiate in the liquid a pressure wave that travels to the orifice to cause a single droplet of liquid to be ejected from the orifice.

27. The method of claim 26, further comprising the step of providing the quantity of liquid at a temperature of between about ½ and about 10 degrees C. more than a temperature at which any liquid at the piezoelectric actuator is maintained.

28. The method of claim 27, the step of providing the quantity of liquid at a temperature that is more than the temperature of any liquid at the piezoelectric actuator comprising the step of heating the quantity of liquid.

29. The method of claim 27, the step of providing the quantity of liquid at a temperature that is more than the temperature of the liquid at the piezoelectric actuator comprising the step of cooling the liquid by when it reaches the piezoelectric actuator.

30. The method of claim 26, further comprising the step of providing the quantity of liquid at a temperature greater than that of any the liquid at the actuator by an amount that is sufficient to decrease the capacity of the warmer liquid to absorb atmospheric gas, relative to the absorption capacity of any the liquid at the actuator by an amount sufficient to substantially eliminate any gas bubbles in any the liquid at the actuator.

31. The method of claim 1, further comprising the steps of:
 a. providing an evaporative heater, thermally coupled to the liquid;
 b. the step of selectively causing a single droplet of liquid to be ejected from the orifice comprising the step of energizing the heater to heat sufficiently to cause a single droplet of liquid to be ejected from the orifice.

32. The method of claim 1, further comprising the step of, during times the nozzle is parked, ejecting a droplet of liquid at a relatively low frequency, as compared to a printing frequency.

33. The method of claim 1, the step of establishing a steady state pressure comprising the step of establishing a steady state pressure that is great enough to cause a cap of liquid to cover the land and orifice when the nozzle is quiescent.

34. The method of claim 1, the step of establishing a steady state pressure comprising the step of establishing a stead state pressure that is great enough to cause a cap of liquid to cover the land and orifice when the nozzle is static.

* * * * *